US012732308B2

(12) United States Patent
Andgart et al.

(10) Patent No.: US 12,732,308 B2
(45) Date of Patent: Sep. 8, 2026

(54) RADIO NETWORK NODE, USER EQUIPMENT AND METHODS FOR MULTI-LEVEL ACK/NACK FEEDBACK

(71) Applicant: Telefonaktiebolaget LM Ericsson (publ), Stockholm (SE)

(72) Inventors: Niklas Andgart, Södra Sandby (SE); Jonas Fröberg Olsson, Ljungsbro (SE); Yufei Blankenship, Kildeer, IL (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 431 days.

(21) Appl. No.: 18/261,694

(22) PCT Filed: Jan. 17, 2022

(86) PCT No.: PCT/SE2022/050048
§ 371 (c)(1),
(2) Date: Jul. 17, 2023

(87) PCT Pub. No.: WO2022/154745
PCT Pub. Date: Jul. 21, 2022

(65) Prior Publication Data

US 2024/0297743 A1 Sep. 5, 2024

Related U.S. Application Data

(60) Provisional application No. 63/138,573, filed on Jan. 18, 2021.

(51) Int. Cl.
*H04L 1/1825* (2023.01)
*H04L 1/1829* (2023.01)

(52) U.S. Cl.
CPC .......... *H04L 1/1825* (2013.01); *H04L 1/1864* (2013.01)

(58) Field of Classification Search
None
See application file for complete search history.

(56) References Cited

U.S. PATENT DOCUMENTS 12,267,157 B2 * 4/2025 Nammi ................ H04L 1/0005
2016/0261321 A1 * 9/2016 Andgart ................ H04L 1/0003
(Continued)

FOREIGN PATENT DOCUMENTS

WO 2018177513 A1 10/2018
WO 2019215253 A1 11/2019
(Continued)

OTHER PUBLICATIONS

International Search Report and Written Opinion dated Apr. 12, 2022 for International Application No. PCT/SE2022/050048 filed on Jan. 17, 2022, consisting of 17-pages.
(Continued)

*Primary Examiner* — Anh Vu H Ly
(74) *Attorney, Agent, or Firm* — Weisberg I.P. Law, P.A.

(57) ABSTRACT

A method performed by a UE for handling communication in a wireless communication network. The method includes receiving, from a radio network node, a configuration data comprising one or more settings used to determine a decoding margin for determining a type of an ACK or NACK message from multi-level ACK or NACK messages. The one or more settings include one or more of: a target BLER, an outer loop target rate, a difference between the target BLER and the outer loop target rate, and a SINR offset. The method also includes transmitting, to the radio network node, the ACK or NACK message of the type for a received transport block, wherein the ACK or NACK message is of the type determined based on the received configuration data.

20 Claims, 18 Drawing Sheets

(56) References Cited

U.S. PATENT DOCUMENTS

2020/0169962 A1 5/2020 Fakoorian et al.
2021/0211242 A1* 7/2021 Andgart ................ H04L 1/1864
2022/0052735 A1* 2/2022 Yang ..................... H04L 1/0026

FOREIGN PATENT DOCUMENTS

WO 2020030178 A1 2/2020
WO 2021123494 A1 6/2021
WO WO-2022154745 A1 * 7/2022 ........... H04L 1/0009

OTHER PUBLICATIONS

H. Shariatmadari et al.; Link Adaptation Design for Ultra-Reliable Communications; Conference paper; ResearchGate; May 2016, consisting of 6-pages.
3GPP TS 38.213 V16.3.0; 3rd Generation Partnership Project; Technical Specification Group Radio Access Network; NR; Physical layer procedures for control (Release 16); Sep. 2020, consisting of 179-pages.
3GPP TS 38.331 V16.3.0; 3rd Generation Partnership Project; Technical Specification Group Radio Access Network; NR; Radio Resource Control (RRC) protocol specification (Release 16); Dec. 2020, consisting of 932-pages.
3GPP TSG-RAN WG1 Meeting #103-e Tdoc R1-2007708; Title: CSI Feedback Enhancements for IIoT/URLLC; Agenda Item: 8.3.1.2; Source: Ericsson; Document for: Discussion; Date and Location: Oct. 26-Nov. 13, 2020, Online, consisting of 13-pages.
ETSI TS 138214 V16.3.0; Technical Specification; 5G; NR; Physical layer procedures for data (3GPP TS 38.214 version 16.3.0 Release 16); Nov. 2020, consisting of 169-pages.

* cited by examiner

10. UE

902. Receiving unit

903. Determining unit

904. Transmitting unit

901. Processing circuitry

905. Memory

RADIO NETWORK NODE, USER EQUIPMENT AND METHODS FOR MULTI-LEVEL ACK/NACK FEEDBACK

CROSS-REFERENCE TO RELATED APPLICATIONS

This application is a Submission Under 35 U.S.C. § 371 for U.S. National Stage Patent Application of International Application No.: PCT/SE2022/050048, filed Jan. 17, 2022 entitled "RADIO NETWORK NODE, USER EQUIPMENT AND METHODS FOR MULTI-LEVEL ACK/NACK FEEDBACK," which claims priority to U.S. Provisional Application No. 63/138,573, filed Jan. 18, 2021, entitled "RADIO NETWORK NODE, UE AND METHODS PERFORMED THEREIN," the entireties of both of which are incorporated herein by reference.

TECHNICAL FIELD

Embodiments herein relate to a radio network node, a user equipment (UE), and methods performed therein regarding wireless communication. Furthermore, a computer program product and a computer readable storage medium are also provided herein. In particular, embodiments herein relate to handling communications in a wireless communications network.

BACKGROUND

In a typical wireless communications network, UEs, also known as wireless communication devices, mobile stations, stations (STA) and/or wireless devices, communicate via a Radio Access Network (RAN) with one or more core networks (CN). The RAN covers a geographical area which is divided into service areas or cells, with each service area or cell being served by a radio network node such as an access node e.g. a Wi-Fi access point or a radio base station (RBS), which in some networks may also be called, for example, a NodeB, a gNodeB, or an eNodeB. The service area or cell is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and investigate e.g. enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and coming 3GPP releases, such as New Radio (NR), are worked on. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as NR, the use of very many transmit- and receive-antenna elements may be of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Due to varying nature of wireless communication channel, data transmission between gNB and UE needs to adapt the modulation scheme and code rate to suit different channel conditions. In NR downlink transmission methods such as multi-layer transmission, transmission point selection, beam selection etc. are very flexible. Therefore, in NR Channel State Information (CSI) may comprise one or more out of:

CQI: Channel Quality Indicator

PMI: Pre-coding Matrix Indicator

CRI: CSI-RS Resource Indicator

LI: Layer Indicator

RI: Rank Indicator

SSBRI: synchronization signal (SS)/physical broadcast channel (PBCH) Block Resource Indicator L1-RSRP: Layer one-reference signal received power In NR the reported CQI value may be with respect to one of three tables, Table 1, Table 2 and Table 3. If Table 1 or Table 2 is configured the UE reports a CQI value such that a physical downlink shared channel (PDSCH) with modulation, target code rate and transport block size corresponding to the CQI value assigned on a so-called CSI reference resource could be received with a Block-Error Probability (BLEP) not exceeding 10%. For Table 1 the highest modulation is 64 Quadrature Amplitude Modulation (QAM), while for Table 2 the highest modulation is 256QAM. For Table 3 the highest modulation is 64QAM but the BLEP shall not exceed $10^{-5}$.

TABLE 1

TS 38.214 V16.3.0, Table 5.2.2.1-2: 4-bit CQI Table

| CQIindex | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |

TABLE 1-continued

TS 38.214 V16.3.0, Table 5.2.2.1-2: 4-bit CQI Table

| CQIindex | modulation | code rate × 1024 | efficiency |
|---|---|---|---|
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 2

TS 38.214 V16.3.0, Table 5.2.2.1-3: 4-bit CQI Table 2

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

TABLE 3

TS 38.214 V16.3.0, Table 5.2.2.1-4: 4-bit CQI Table 3

| CQI index | modulation | code rate × 1024 | efficiency |
|---|---|---|---|
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

Hybrid Automatic Repeat Request (HARQ) is an integral part of the cellular communication standards that allows reliable communication between a wireless device and a network node by means of incremental redundancy. The transport block to be transmitted is subjected to forward error correction (FEC) encoding by which redundancy is introduced. The number of bits increases due to the introduced redundancy, but not all bits are sent at the same time. The resulting bits are segmented into several so-called redundancy versions (RV), for example, 4 RVs, where each such redundancy version further is punctured before being sent in order to fit it within the given allocation, one or more resource block pairs. How much is punctured is depending on how many bits, e.g. information plus redundant bits, that can be carried in the allocation, which further is depending on the allocation bandwidth, the modulation in use, e.g., Quadrature phase shift keying (QPSK): 2 bits, 16QAM: 4 bits, 64QAM: 6 bits, 256QAM: 8 bits, and the presence of broadcasted signals and channels in the allocated bandwidth. The ratio between the information bits and information bits plus redundant bits in a transport block is referred to as code rate. In good radio conditions, the code rate can be close to 1, i.e., very little redundancy, and the code rate decreases with worsened radio conditions, e.g., gradually increasing redundancy of information. The combination of code rate and modulation type is referred to as modulation and coding scheme (MCS).

Incremental redundancy allows the UE to attempt to receive and decode a first redundancy version of the transport block, and in case it fails, it receives a second redundancy version of the transport block, which it combines with the first one in so called soft combining and tries to decode.

The receiving entity, such as a UE or a base station, provides feedback to the transmitting entity on whether it decoded the transport block successfully, i.e., transmitting an acknowledgement (ACK) or whether it failed, i.e., transmitting a non-acknowledgement (NACK). The transmitting entity may then decide on whether to transmit another redundancy version for the same block, or send a redundancy version for a next transport block.

In case the maximum number of retransmissions is reached without the receiving entity being able to decode the transport block, it will be detected by higher layers, such as Radio Link Control (RLC), generally within 50-100 ms that a protocol data unit (PDU) is missing and a retransmission is requested for all transport blocks that comprise the RLC PDU, even those that may have been successfully. This is referred to as automatic repeat request (ARQ) and has considerably larger latency than HARQ retransmissions.

The UE carries out measurements to provide indications to the base station on the perceived radio propagation conditions in what is called CQI reporting. Based on the CQI reporting the base station can decide roughly which MCS to use for communication with the UE. Examples of mapping between CQI and MCS are shown in the tables above. The three tables are targeted different operating environments, where the “Table 3” is a low-MCS table targeted Ultra-reliable low-latency communication (URLLC) applications. In low channel quality, e.g., with a low CQI index, more forward error correction (FEC) encoding is needed for successful decoding of the information bits, and vice versa in high channel quality, e.g., with a high CQI index. Hence at high CQI the throughput of information bits can be made higher than at low CQI.

In order to get a good system throughput, the base station, such as an eNB, carries out link adaptation by which it matches each UE’s reported channel quality to an MCS that provides the right balance between system throughput and throughput for the individual user. The MoS is indicated to the UE in the downlink control information (DCI) provided over PDCCH; see Table 4.

In addition to CQI reporting, a base station typically has an outer loop that, based on ACK/NACK reports, tunes in the MCS value to a suitable value giving a block error ratio (BLER), which is a ratio between NACKs and total number of received or expected ACK/NACKs, of e.g. 10%. Besides catering for flexibility in which target BLER is used, e.g., 1%, 10%, 30%, it also solves the problem that each UE model or even UEs of the same model may have an individual bias in the reported CQI. The base station thus maintains a UE-specific CQI offset which it tunes to give the desired BLER target.

TABLE 4

Modulation and TBS index table for PDSCH (38.241 Table 5.1.3.1-3: MCS index table 3 for PDSCH)

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

SUMMARY

As part of developing embodiments herein one or more problems have been identified. To maintain a desired BLER, an outer loop link adaptation may be implemented by the gNB. A typical operation is to decrease a back-off with a certain value upon each ACK, and increase the back-off with a larger amount after a NACK. Depending on the desired BLER, the ratios of the ACK and NACK adjustments can be varied. This works well in the mobile broadband (MBB) case with a typical BLER target of 10-1, but in a URLLC scenario with much lower target BLER, there are almost no NACK events to act upon, in particular for a low-latency case where retransmissions should be avoided. A way to make an outer-loop link adaptation work also for low BLER targets, is to make the outer loop act on events before they lead to a block error. This can be done by letting the ACK also include a measure of the decoding margin:

ACK_high_margin: PDSCH pass with high decoding margin

ACK_low_margin: PDSCH pass with low decoding margin

NACK: PDSCH fail

Then the gNb can adjust an outer loop without missing the first transmission attempt. Instead of operating on the NACK/ACK ratio, an outer loop could operate on the ratio (NACK+ACK_low_margin)/ACK_high_margin.

Then, the outer loop can operate on a certain target event rate, say 1e-2, high enough for convergence to be possible. But since the actual error events occur much more seldom than the low margin ACK, the resulting BLER will be much lower, see FIG. 1.

While a multi-level ACK has the possibility to lower the resulting BLER, in order for the UE to decide between a low or a high margin ACK, and for the gNB to be able to apply the reports in a way that adequately improves the performance, there must be a common understanding of what the different reporting levels mean. There is thus a need for the network to configure the UE to report multi-level ACK or NACK.

Therefore, herein are possible enhancements provided to address the issue.

An object herein is to provide a mechanism to handle communication in an efficient manner to improve performance of the wireless communications network.

According to an aspect the object is achieved, according to embodiments herein, by providing a method performed by a UE for handling communication in a wireless communication network. The UE receives, from a radio network node, a configuration data comprising one or more settings used to determine a decoding margin for determining a type of an ACK or NACK message from multi-level ACK or NACK messages, wherein the one or more settings comprise one or more of: a target BLER, an outer loop target rate, a difference between the target BLER and the outer loop target rate, and a signal to interference plus noise ratio (SINR) offset. The UE further transmits, to the radio network node, the ACK or NACK message of the type for a received transport block, wherein the ACK or NACK message is of the type determined based on the received configuration data.

Thus, it is herein provided a method performed by a UE for handling communication in a wireless communication network. The UE receives configuration from a radio network node comprising different settings, comprising one or more of:

Desired target BLER,

Target rate used in outer loop,

Difference between target BLER and outer loop target rate,

Desired SINR offset.

The UE further transmits a multi-level ACK/NACK back to the wireless communications network.

According to another aspect the object is achieved, according to embodiments herein, by providing a method performed by a radio network node for handling communication in a wireless communications network. The radio network node provides, to a UE, a configuration data comprising one or more settings used to determine a decoding margin for determining a type of an ACK or NACK message from multi-level ACK or NACK messages, wherein the one or more settings comprise one or more of: a target BLER an outer loop target rate, a difference between the target BLER and the outer loop target rate, and a SINR offset. The radio network node further receives, from the UE, the ACK or NACK message of the type for a received transport block, wherein the ACK or NACK message is of the type determined based on the received configuration data.

Thus, it is herein provided a method performed by a radio network node for handling communication in a wireless communications network. The radio network node configures the UE with different settings, comprising one or more of:

Desired target BLER,

Target rate used in outer loop,

Difference between target BLER and outer loop target rate,

Desired SINR offset.

The radio network node further configures the UE to transmit a multi-level ACK/NACK back to the wireless communications network.

According to an aspect the object is achieved, according to embodiments herein, by providing a UE and a radio network node configured to perform the methods herein, respectively.

According to an aspect the object is achieved, according to embodiments herein, by providing a UE for handling communication in a wireless communication network. The UE is configured to receive, from a radio network node, a configuration data comprising one or more settings used to determine a decoding margin for determining a type of an ACK or NACK message from multi-level ACK or NACK messages, wherein the one or more settings comprise one or more of: a target BLER, an outer loop target rate, a difference between the target BLER and the outer loop target rate, and a SINR offset. The UE is further configured to transmit, to the radio network node, the ACK or NACK message of the type for a received transport block, wherein the ACK or NACK message is of the type determined based on the received configuration data.

According to an aspect the object is achieved, according to embodiments herein, by providing a radio network node for handling communication in a wireless communications network. The radio network node is configured to provide, to a UE, a configuration data comprising one or more settings used to determine a decoding margin for determining a type of an ACK or NACK message from multi-level ACK or NACK messages, wherein the one or more settings comprise one or more of: a target BLER, an outer loop target rate, a difference between the target BLER and the outer loop target rate, and a SINR offset. The radio network node is configured to receive, from the UE, the ACK or NACK message of the type for a received transport block, wherein the ACK or NACK message is of the type determined based on the received configuration data.

It is furthermore provided herein a computer program product comprising instructions, which, when executed on at least one processor, cause the at least one processor to carry out the method above, as performed by the UE or the radio network node, respectively. It is additionally provided herein a computer-readable storage medium, having stored thereon a computer program product comprising instructions which, when executed on at least one processor, cause the at least one processor to carry out the method according to the method above, as performed by the UE or the radio network node, respectively.

Embodiments herein disclose procedures for the UE to transmit multilevel feedback to the radio network node leading to that the radio network node may be able to adjust the capacity earlier and omit retransmissions. This will thus result in an improved performance of the wireless communications network.

BRIEF DESCRIPTION OF THE DRAWINGS

Embodiments will now be described in more detail in relation to the enclosed drawings, in which.

DETAILED DESCRIPTION

Figure 1:
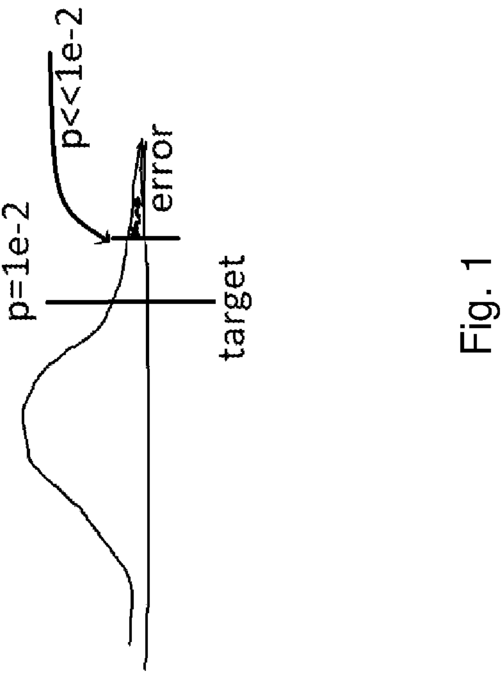
FIG. 1 shows a multi-level ACK where the outer loop operates on a certain target event rate, illustrating an example of BLER.
Figure 2:
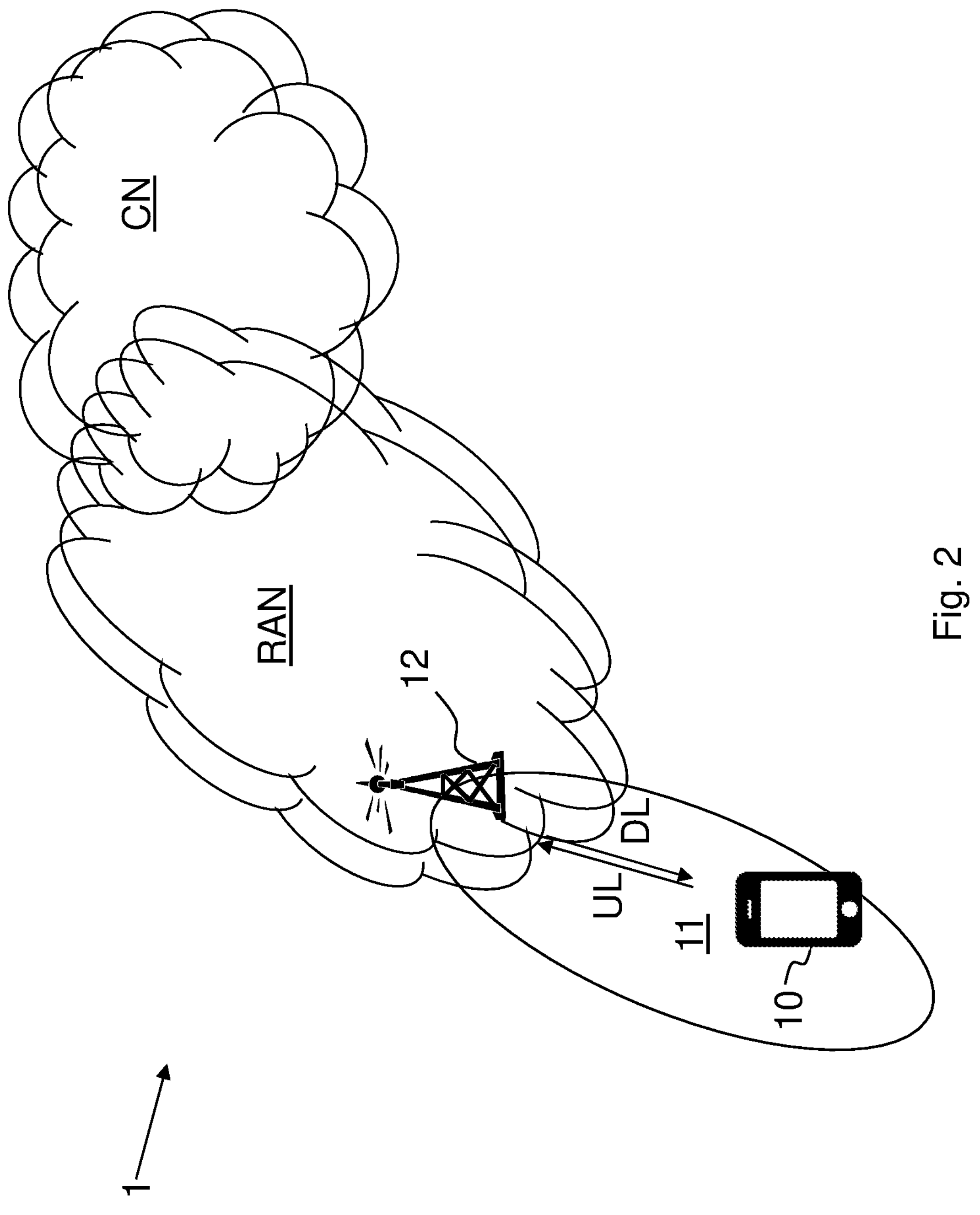
FIG. 2 shows an overview depicting a wireless communications network according to embodiments herein.

Embodiments herein relate to wireless communications networks in general. FIG. 2 is a schematic overview depicting a wireless communications network 1. The wireless communications network 1 comprises one or more RANs and one or more CNs. The wireless communications network 1 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communications network 1, a user equipment (UE) 10 exemplified herein as a wireless device such as a mobile station, a non-access point (non-AP) station (STA), a STA and/or a wireless terminal, is comprised communicating via e.g. one or more Access Networks (AN), e.g. radio access network (RAN), to one or more core networks (CN). It should be understood by the skilled in the art that “UE” is a non-limiting term which means any terminal, wireless communications terminal, user equipment, narrowband internet of things (NB-IoT) device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communications network 1 comprises a first radio network node 12 or just radio network node, providing radio coverage over a geographical area, a first service area 11 or first cell, of a first radio access technology (RAT), such as NR, LTE, or similar. The radio network node 12 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node depending e.g. on the first radio access technology and terminology used. The radio network node may be referred to as a serving radio network node wherein the service area may be referred to as a serving cell, and the serving network node communicates with the wireless device in form of DL transmissions to the wireless device and UL transmissions from the wireless device. It should be noted that a service area may be denoted as cell, beam, beam group or similar to define an area of radio coverage.

A mechanism is herein provided for a scenario that comprises at least one UE, e.g., the UE 10, which is operating in a first cell, such as cell 11, served by the radio network node 12, denoted as network one (NW1). The radio network node 12 configures the UE 10 with different settings. The UE 10 transmits a high margin ACK or a low margin ACK based on a threshold value. The high margin ACK or the low margin ACK may be selected from a plurality of multi-level ACK/NACK messages also referred to as multi-level ACK or NACK messages herein.

Accordingly, embodiments herein provide a radio network node, a UE, and methods performed therein for handling communications in an efficient manner to improve performance of the wireless communications network. The radio network node configures the UE to report an ACK or NACK message upon successful decoding of a transport block, using two or more levels, based on estimated decoding margin. To configure the UE 10, the radio network node 12 provides to the UE 10 a configuration data comprising one or more settings used to determine a decoding margin for determining a type of an ACK or NACK message from multi-level ACK or NACK messages. The ACK or NACK message is also referred to herein as an ACK/NACK message. In some embodiments, the ACK or NACK message comprises a Hybrid Automatic Repeat Request Acknowledgment (HARQ-ACK).

The one or more settings comprise one or more of: a target BLER, an outer loop target rate, a difference between the target BLER and the outer loop target rate, and an SINR offset. The UE may select between two or more levels based on thresholds, which may be calculated based on reliability metrics.

Figure 3A:
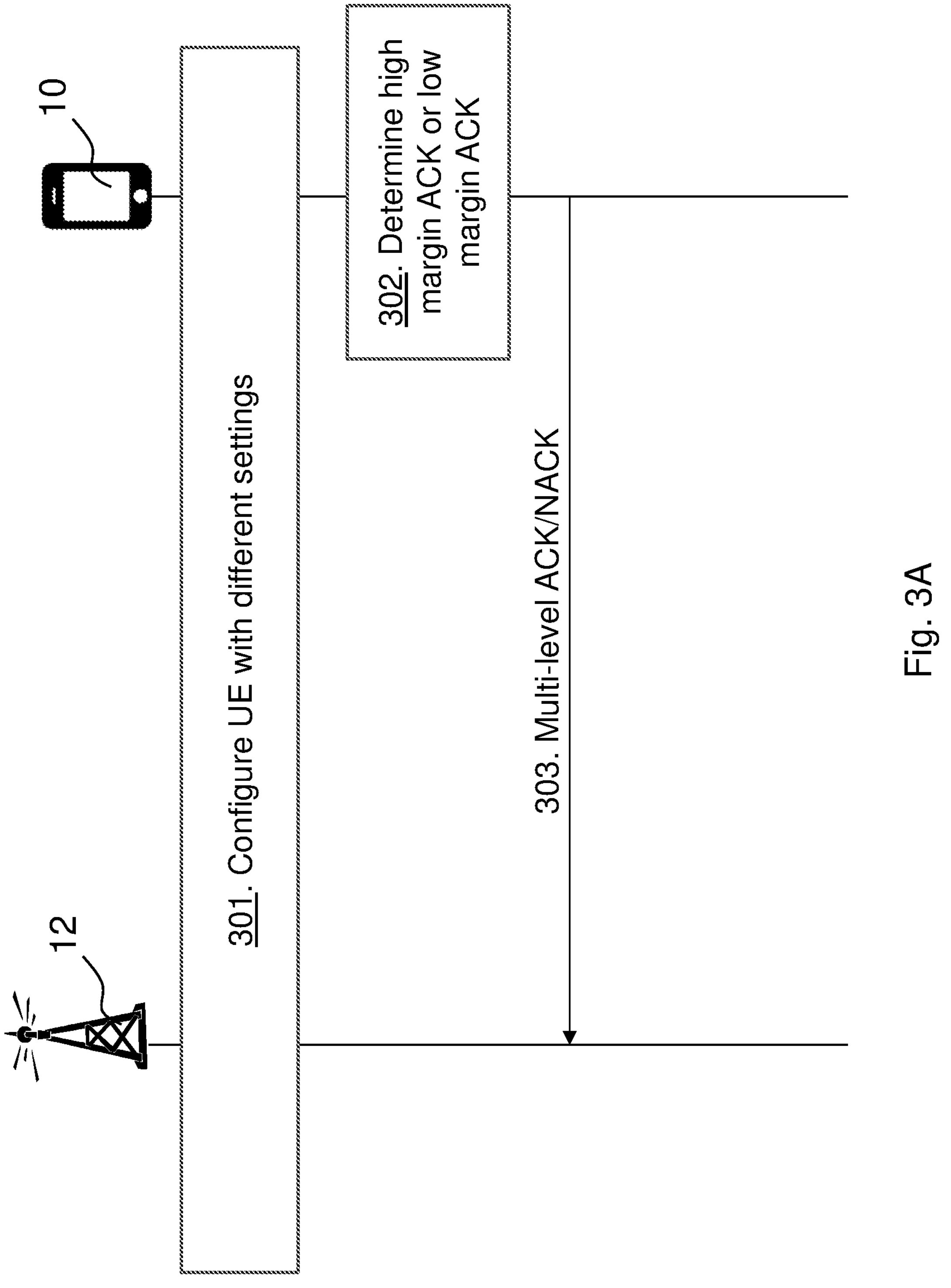
FIG. 3A shows a combined signalling scheme and flowchart depicting embodiments herein.

FIG. 3A is a combined signalling scheme and flowchart depicting embodiments herein.

Action 301. The radio network node 12 may configure the UE 10 with a number of different settings such as one or more parameters, thresholds and/or the like, to determine when to use which type or level of multilevel ACK/NACK, also referred to herein as an ACK or NACK message.

Action 302. The UE 10 may determine whether to use a high margin ACK or a low margin ACK based on a threshold value. In some embodiments, the UE 10 may transmit an ACK or NACK message selected from more than two types or levels of multi-level ACK or NACK messages. The threshold may be calculated based on configured reliability metrics. The reliability metrics may be one or more of: Signal-to-Noise Ratio (SNR) offset, an SINR offset, a BLER or Block-Error Probability (BLEP), a target outer loop BLER or BLEP.

Action 303. The UE 10 transmits a high margin ACK, a low margin ACK, or an ACK or NACK message having a certain level, as determined. In some cases, the ACK or NACK message comprises a NACK message. Thus, the UE 10 may transmit a multi-level ACK or NACK message of the type determined based on the received configuration data.

Figure 3B:
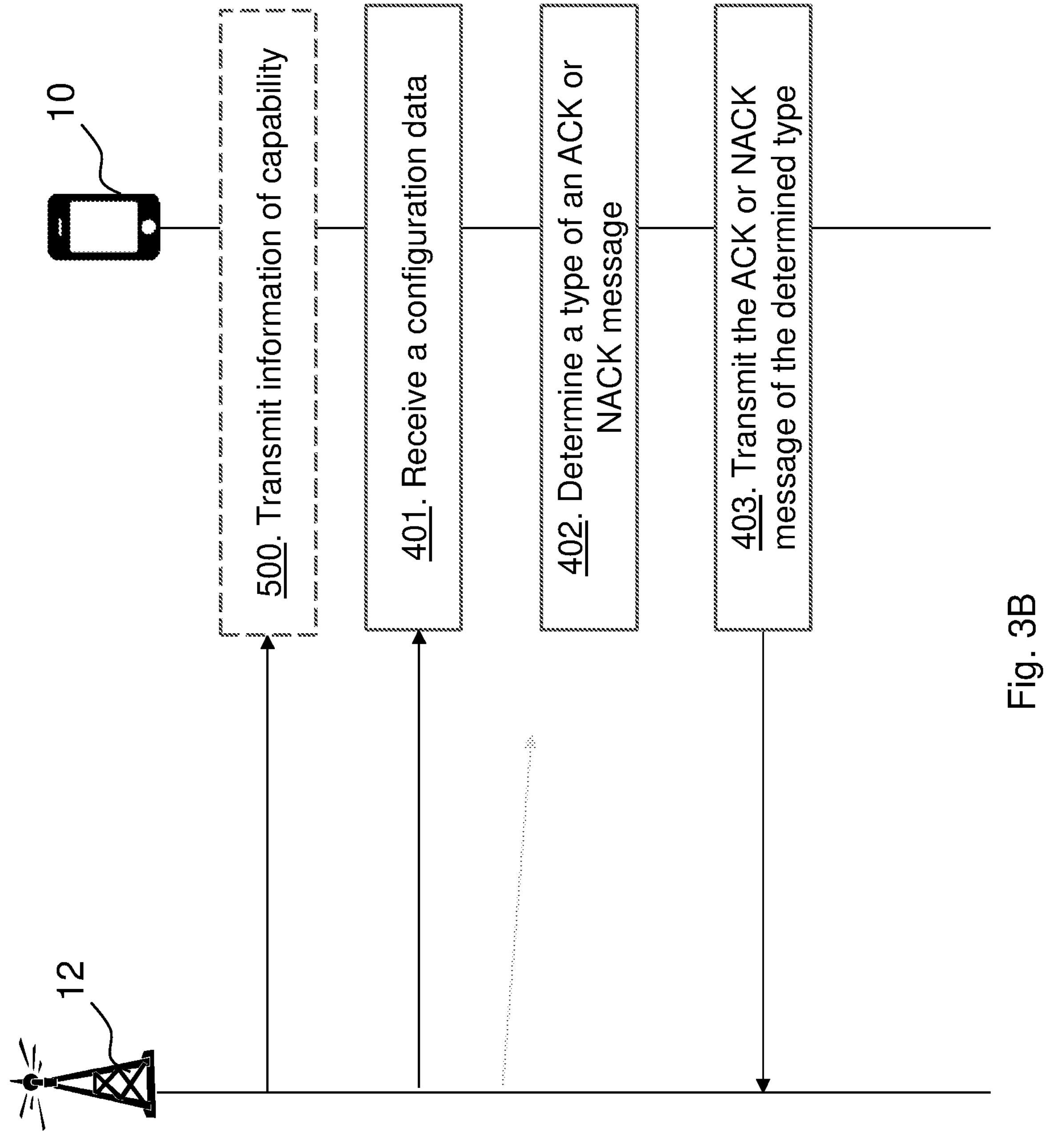
FIG. 3B shows a flowchart illustrating a method performed by a UE according to embodiments herein.

FIG. 3B illustrates a method performed a UE such as the UE 10, in accordance with some embodiments herein.

Action 400. The UE 10 may report its capability of generating multi-level HARQ-ACK. The capability may be a function of subcarrier spacing (SCS), band, band combination, etc. In response to the information on the UE's capability reporting, the radio network node 12 may configure the UE 10 to report a multi-level ACK or NACK message such as a multi-level HARQ-ACK, see action 401. Accordingly, in some embodiments, the UE 10 may transmit, to the radio network node 12, information on capability of the UE 10 to generate the multi-level ACK or NACK messages, wherein the UE 10 may further receive, from the radio network node 12, the configuration data based on the transmitted information on the capability of the UE 10 to generate the multi-level ACK or NACK messages, see action 401.

Action 401. The UE 10 receives from the radio network node 12, the configuration data comprising the one or more settings used to determine the decoding margin for determining the type of an ACK or NACK message from multi-level ACK or NACK messages, wherein the one or more settings comprise one or more of: the target BLER, the outer loop target rate, the difference between the target BLER and the outer loop target rate, and the SINR offset.

Action 402. The UE 10 determines the type of the ACK or NACK message for the received transport block. The type or level of the ACK or NACK message from the multi-level ACK or NACK messages may be determined based on the decoding margin.

A setting from the one or more settings may be compared to the respective threshold to determine the decoding margin.

In some embodiments, the threshold may be determined using reliability metrics comprising one or more of: a SNR offset, the SINR offset, the target BLER, and a target BLEP.

In some embodiments, the threshold may be determined based on the difference between the target BLER and the outer loop target rate.

In some embodiments, the threshold is the difference between the target BLER and the outer loop target rate.

In some embodiments, the decoding margin is determined based on the SINR offset and the target BLER, wherein the method further comprises:

- determining an impairment comprising a number of n decoding iterations used to decode the transport block;
- determining a first HARQ-ACK message determined without the impairment and a second HARQ-ACK message determined with the impairment, wherein
  - if the impairment is determined to be $n \leq n\_max$, where n_max is the maximum number of iterations the UE 10 uses:
    - the second HARQ-ACK message is determined as ACK if decoding is successful after n iterations; and the second HARQ-ACK message is determined as NACK if decoding is not successful after n iterations;

if both the first HARQ-ACK message and the second HARQ-ACK message are determined as ACK, determining the ACK or NACK message comprising a high margin ACK message; and if the first HARQ-ACK message is determined as ACK while the second HARQ-ACK message is determined as not ACK, determining the ACK or NACK message comprising a low margin ACK message.

The decoding margin may be determined using various techniques described herein, or a combination thereof. The UE 10 may have access to decoding performance curves, which may assist in selecting a correct level of impairment, e.g. a number of iterations in decoding.

Action 403. The UE 10 transmits, to the radio network node 12, the ACK or NACK message for the received transport block, wherein the ACK or NACK message is of the type determined based on the received configuration data.

In some embodiments, the UE 10 may transmit, to the radio network node 12, the ACK or NACK message by: transmitting the ACK or NACK message comprising a high margin ACK message if successful decoding of the transport block is obtained before a certain number of iterations; and transmitting the ACK or NACK message comprising a low margin ACK message if successful decoding of the transport block is obtained after the certain number of iterations.

In some embodiments, the ACK or NACK message may comprise an n-bit HARQ-ACK that is constructed and provided as the feedback. Instead of 2 values, e.g., '0' for NACK and '1' for ACK, provided by 1-bit HARQ-ACK, n-bit HARQ-ACK has $2^n$ values where n is an integer greater than or equal to 2. The multi-level HARQ-ACK allows the receiver to provide richer feedback to the sender of data packet(s). A mapping table may be provided to code the meaning of the $2^n$ values of multi-level HARQ-ACK when n>1. The system may choose to use the (n=1)-bit HARQ-ACK or the (n>1)-bit HARQ-ACK. A higher-layer parameter can be used to indicate the feedback mode, i.e. n=1 vs n>1. The higher-layer parameter may be a radio resource control (RRC) parameter, a media access control (MAC) parameter, or a combination of RRC and MAC parameters.

In some embodiments, the UE 10 may transmit, to the radio network node 12, the ACK or NACK message along with a CSI feedback comprising a recommendation of MCS change for scheduling of a further transport block. Thus, the ACK or NACK message may be a composite of ACK/NACK and CSI feedback, as described in more detail below in connection with Tables 6 and 7.

In some embodiments, the ACK or NACK message, e.g. a multi-level HARQ-ACK, provides acknowledgement of data packet or packets reception as well as control data reception. Thus, in some embodiments, the method performed by the UE 10 comprises transmitting, to the radio network node 12, the ACK or NACK message along with feedback about downlink control channel, such as PDCCH, reception. An example of the mapping table is shown in Table 8, discussed below. The feedback about the PDCCH reception may be in the format of delta_IndexAL, which provides the UE's recommendation of aggregation level (AL) to use in future PDCCH transmissions, assuming the DCI size is approximately the same as the DCI size associated with the reference aggregation level $AL_a$.

Furthermore, in some embodiments, the mapping table may be constructed such that it includes information about both MCS and AL, in addition to HARQ-ACK. An example of such embodiment is discussed and illustrated in Table 9, below.

In some embodiments, the information beyond hard ACK/NACK, e.g., delta_MCS, delta_IndexAL, etc., is provided per group of PDSCH, instead of per individual PDSCH.

In some embodiments, the ACK or NACK message or multi-level HARQ-ACK is only applied to certain HARQ-ACK codebook type(s), and not applied to other codebook type or types. For example, the radio network node 12 may configure the UE 10 that Type 2 codebook can use 1-bit HARQ-ACK mode or n-bit HARQ-ACK mode (n>1), and do not allow n-bit HARQ-ACK mode to codebook Type 1 and Type 3.

In some embodiments, the multi-level HARQ-ACK is only applicable to certain Bandwidth parts (BWP) or serving cells, for example, where the URLLC traffic is being served. BWPs or serving cells that do not need expanded HARQ-ACK feedback may not be configured with multi-level HARQ-ACK.

Figure 3C:
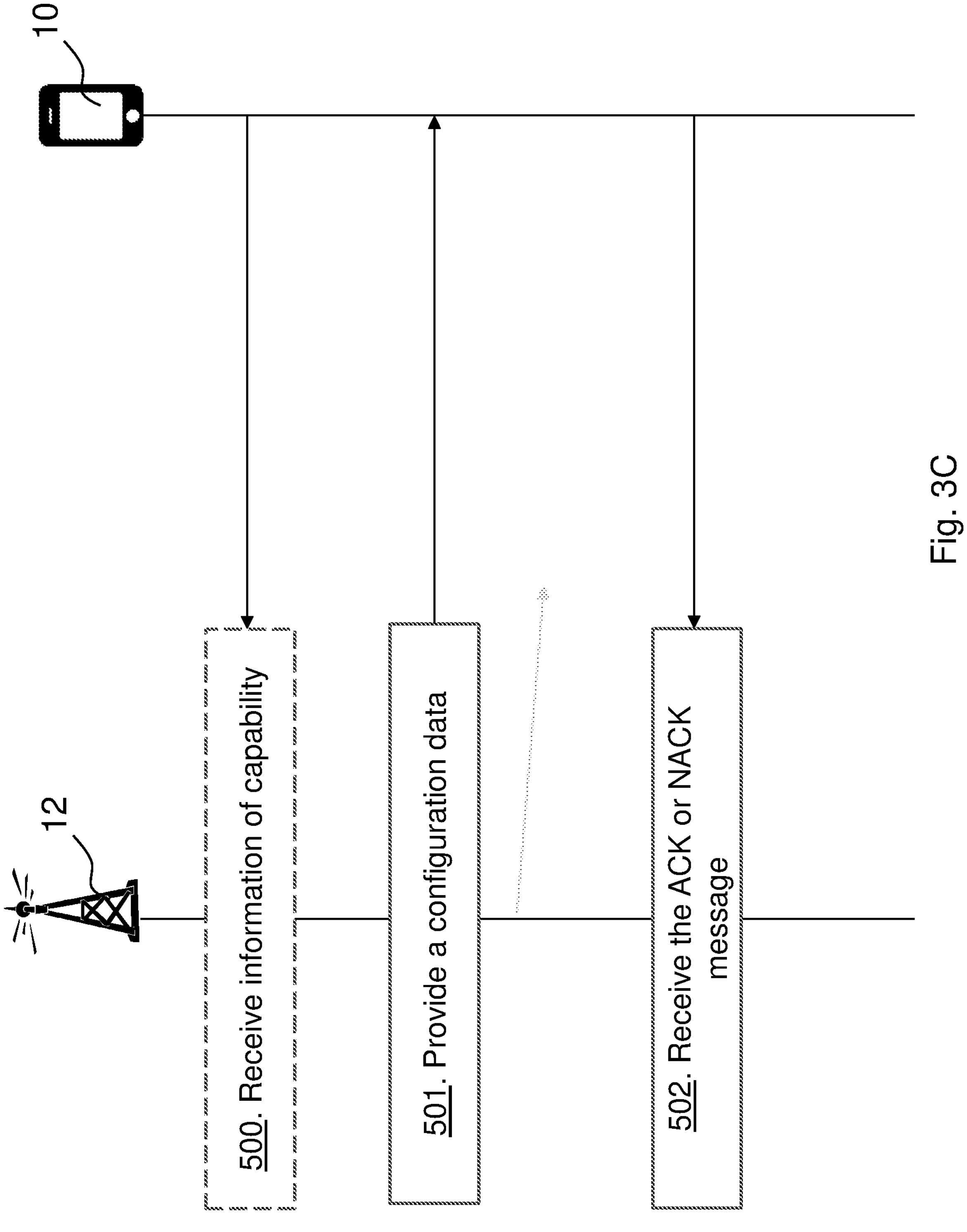
FIG. 3C shows a flowchart illustrating a method performed by a radio network node according to embodiments herein.

FIG. 3C illustrates a method performed a network node such as the radio network node 12, in accordance with some embodiments herein.

Action 500. The radio network node 12 may receive, from the UE 10, information on capability of the UE 10 to generate the multi-level ACK or NACK messages, wherein the radio network node 12 may further provide, to the UE 10, see action 501, the configuration data based on the received information on the capability of the UE 10 to generate the multi-level ACK or NACK messages.

Action 501. The radio network node 12 provides, to the UE 10, the configuration data comprising the one or more settings used to determine the decoding margin for determining the type of an ACK or NACK message from multi-level ACK or NACK messages, wherein the one or more settings comprise one or more of: the target BLER, the outer loop target rate, the difference between the target BLER and the outer loop target rate, and the SINR offset. The radio network node 12 thus configures the UE 10 to report multi-level ACK or NACK messages.

Action 502. The radio network node 12 receives, from the UE 10, the ACK or NACK message of the type for the received transport block, wherein the ACK or NACK message is of the type determined based on the received configuration data.

The radio network node 12 may receive, from the UE 10, the ACK or NACK message along with a CSI feedback comprising a recommendation of MCS change for scheduling of a further transport block. The radio network node 12 may receive, from the UE 10, the ACK or NACK message along with feedback about PDCCH reception. The feedback about the PDCCH reception may include a recommendation of AL to use in future PDCCH transmission. The radio network node may thus perform a transmission, a future transmission, based on the received type of ACK or NACK message.

Figure 4:
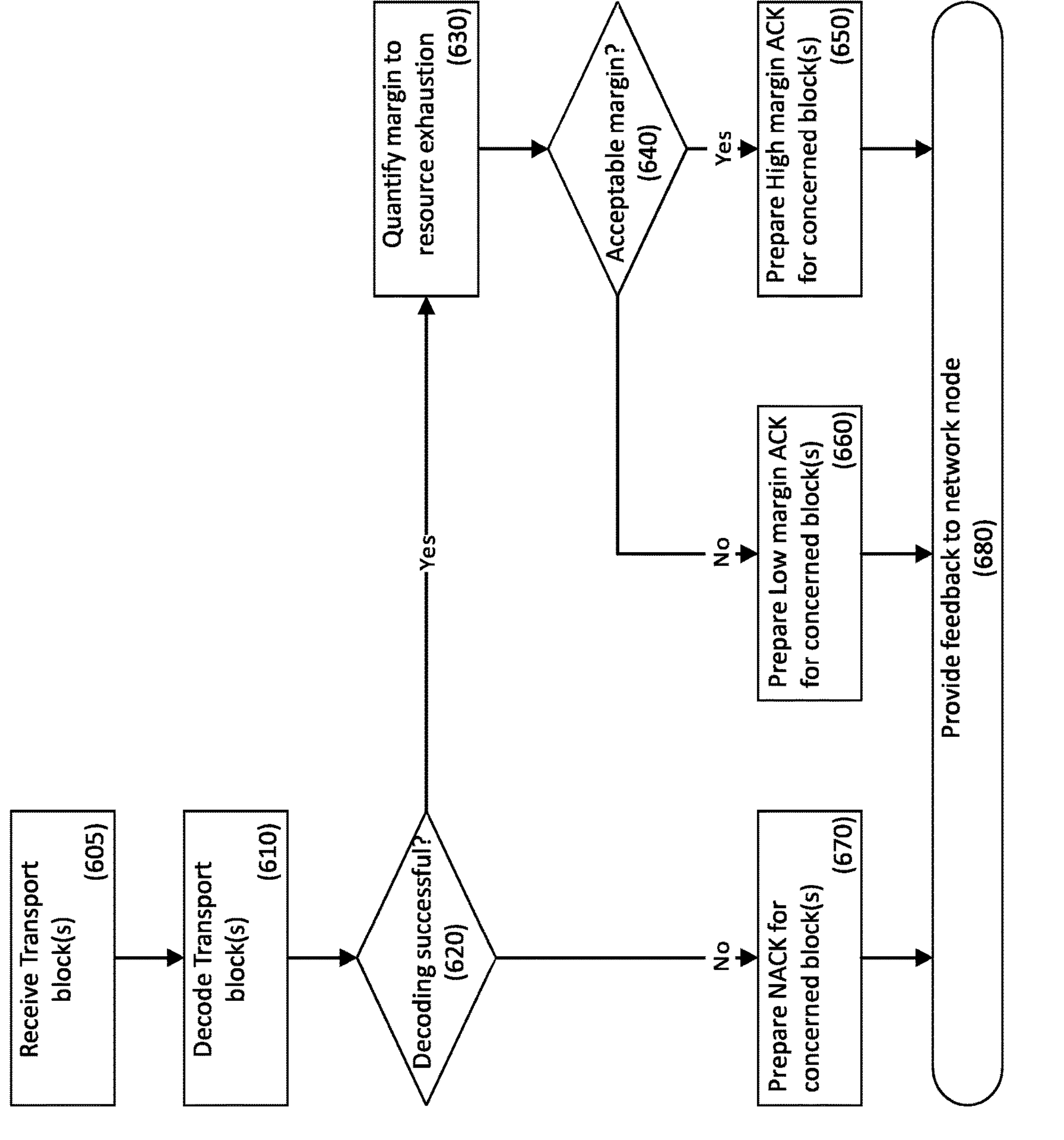
FIG. 4 depicts a flowchart illustrating a method performed by a UE according to some embodiments herein.

FIG. 4 discloses a method or process 600 performed by the UE 10 according to some embodiments herein. As shown in FIG. 4, one or more transport blocks received, see block 600, by the UE 10 are decoded, see block 610. If it is determined at decision block 620 that the decoding is successful, the process 600 follows to quantify a decoding margin to resource exhaustion, see block 630. If it is determined, at decision block 640, that the decoding margin is acceptable, a high margin ACK message is prepared, see block 650, for the transport blocks. If it is determined, at decision block 640, that the margin is not acceptable, a low margin ACK message is prepared, see block 660, for the transport blocks. If it is determined at decision block 620 that the decoding is not successful, the process 600 follows to prepare, see block 670, a NACK message for the transport blocks. The NACK, high margin ACK message, or low margin ACK message is transmitted as a feedback to the radio network node 12.

Methods for Estimation of Decoding Margin.

The UE 10 may obtain a measure of decoding margin in various ways. Here are a few examples:

Number of Iterations.

The UE 10 may report a high margin ACK if successful decoding is obtained before a certain number of iterations are carried out in a decoder of the UE 10. The UE 10 may report a low margin ACK if decoding is successful after more than a certain number of iterations.

The number of iterations may be constant or may be configured in a configuration message to the UE. The number of iterations may also be determined by the UE 10 based on calculation from other parameters.

The number of iterations may be different between different code block or transport block sizes, or the number of iterations may be different between different modulation orders. In some embodiments, the threshold of number of iterations may be lower for smaller constellations, or with smaller time/frequency allocations.

Simulated Examples.

Figure 5A:
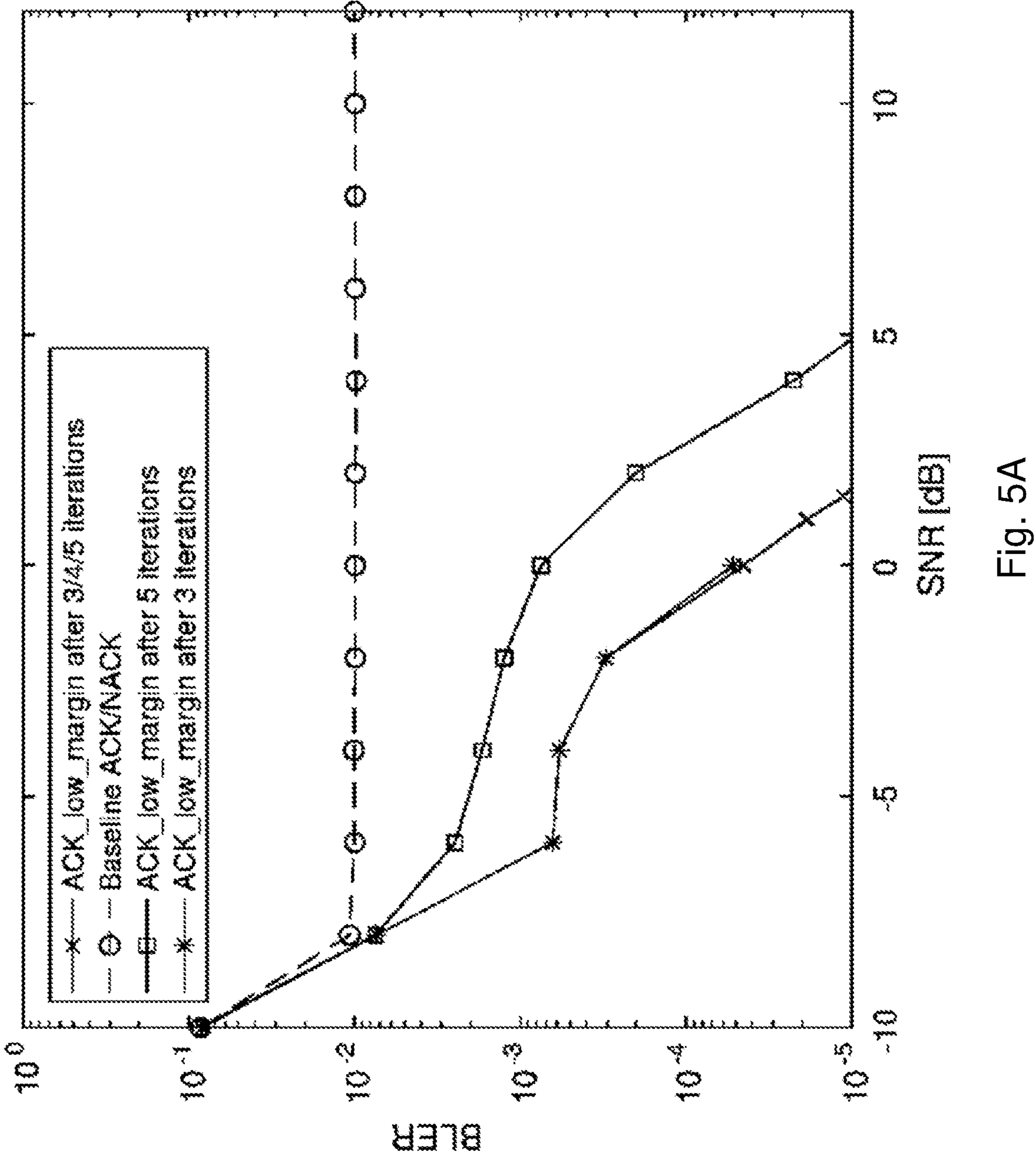
FIGS. 5A and 5B are graphs illustrating simulation results as BLER (FIG. 5A) and throughput (FIG. 5B) as a function of SNR, according to some embodiments herein.
Figure 5B:
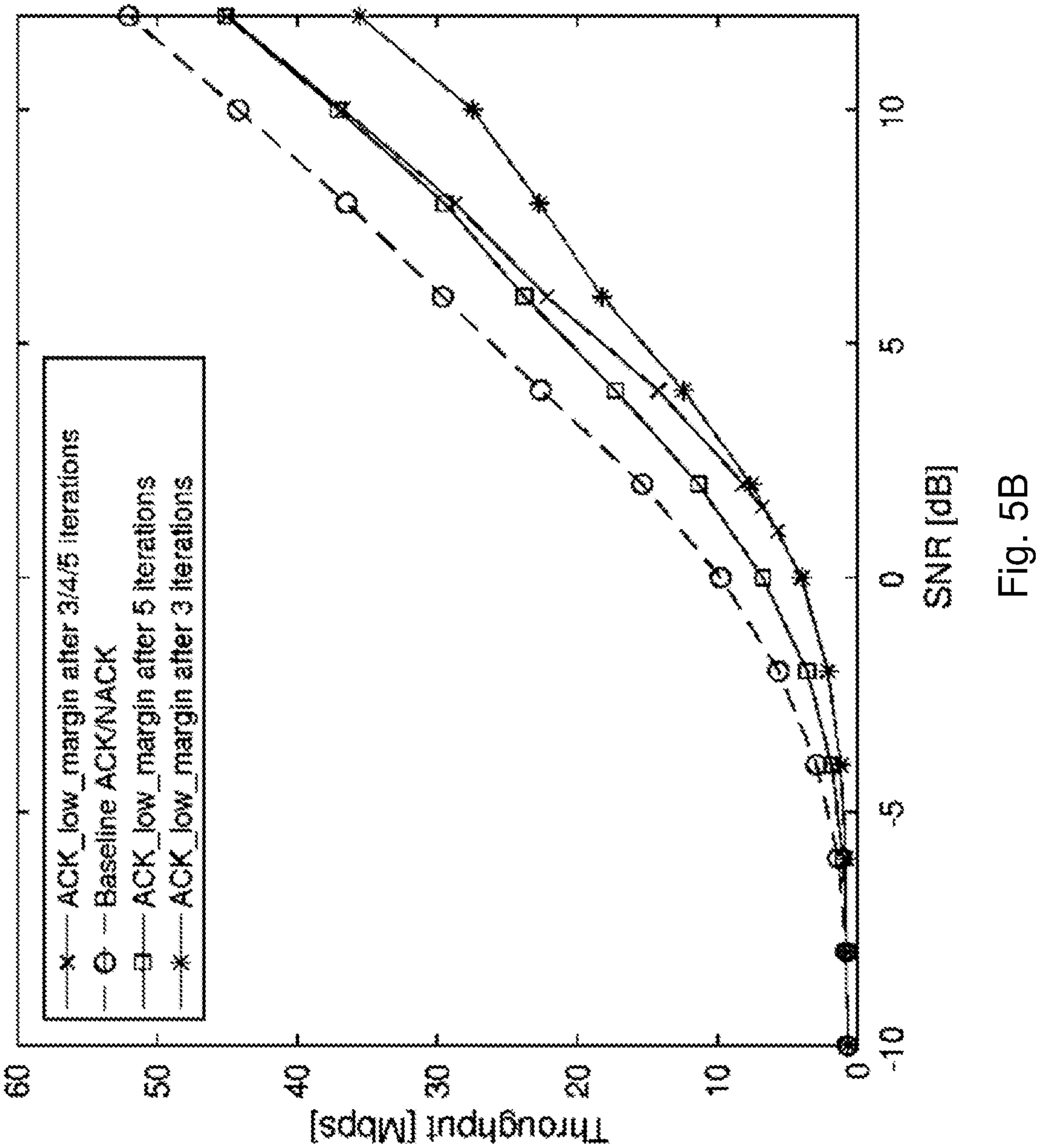

Illustrating simulations are shown in FIGS. 5A and 5B, simulation assumptions are listed in Table 5), which show BLER and throughput as a function of SNR in decibels (dB). In FIGS. 5A and 5B, “x” symbols represent ACK_low_margin after 3/4/5 iterations, circles represent baseline ACK/NACK, squares represent ACK_low_margin after 5 iterations, and stars represent ACK_low_margin after 3 iterations. In addition to a baseline case, where the outer loop is triggered on NACKs, other curves show the case where the outer loop is triggered on both NACK and ACK_low_margin, where the ACK_low_margin is reported if a low-density parity-check (LDPC) decoder succeeded, but not within a limited number of iterations. The simulation uses an outer loop target rate of 1%, a value that is chosen smaller than for the MBB case, but not so small that convergence will be impossible. The resulting BLER will then be lower than the outer loop target rate, since the decoder is allowed to run several additional iterations even after ACK_low_margin is reported. The actual resulting BLER value will depend on where the event threshold is set. A smaller number of iterations before reporting an ACK_low_margin will lead to a lower BLER but will, due to the larger resulting back-off, also reduce the resulting throughput, which can be seen comparing the curves for 3 and 5 iteration thresholds. As is visible in FIG. 5A, to reach a low resulting BLER also at lower SNR, a lower threshold may be used. The curve marked “3/4/5” iterations uses different thresholds for different modulations: 3 iterations for QPSK, 4 for 16QAM and 5 for 64QAM. In this way, the BLER is further reduced on lower SNR; while on higher SNR, excessive backoff is avoided.

FIGS. 5A and 5B show a resulting BLER and throughput after triggering outer loop on decoding success after a limited number of decoding iterations. 52 physical resource block (PRB) allocation. Outer-loop target rate of 1%. If the outer loop is triggered before the decoder is finished decoding, the resulting BLER will decrease.

Figure 6A:
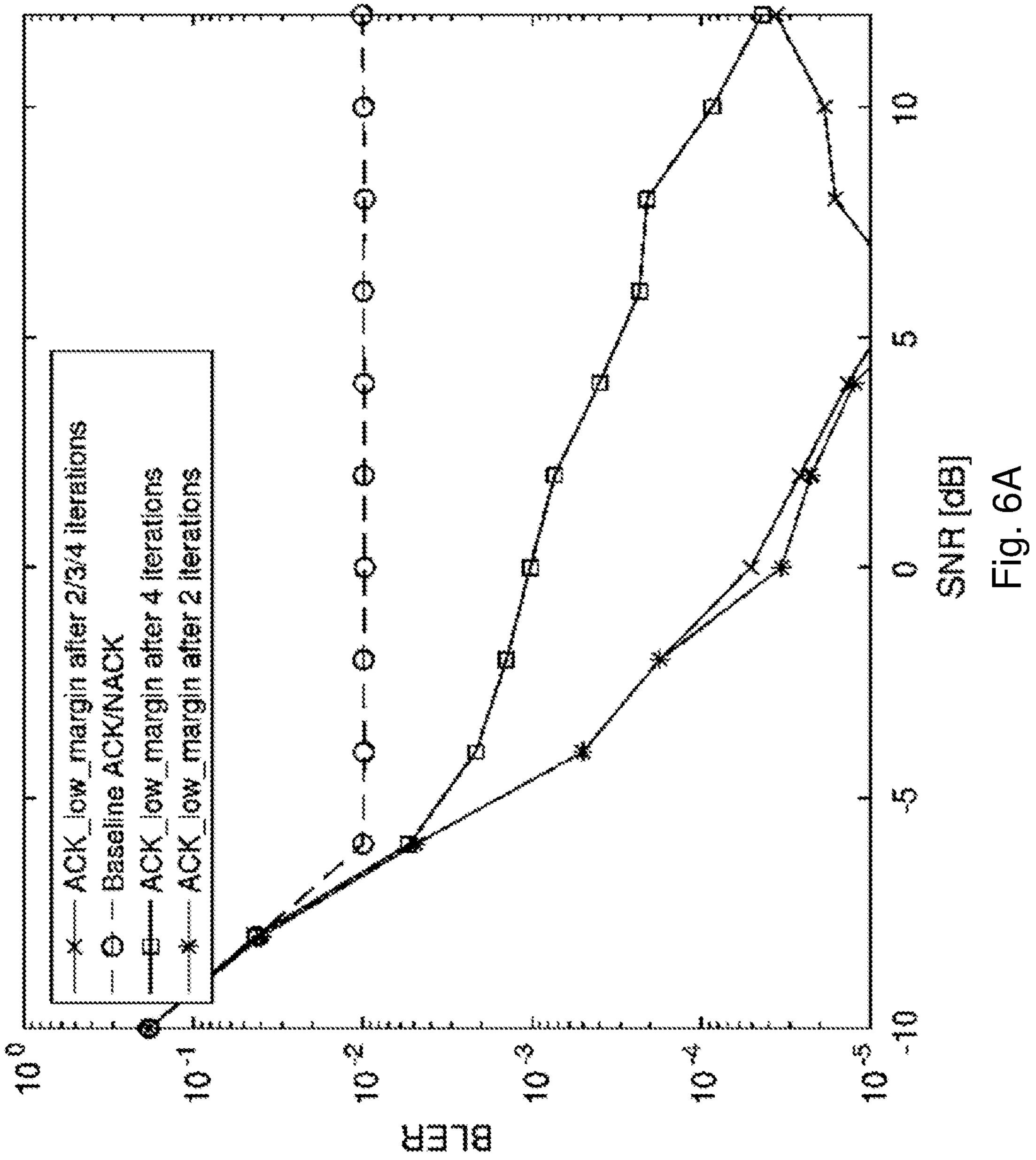
FIGS. 6A and 6B are graphs illustrating simulation results as BLER (FIG. 6A) and throughput (FIG. 6B) as a function of SNR, according to some embodiments herein.
Figure 6B:
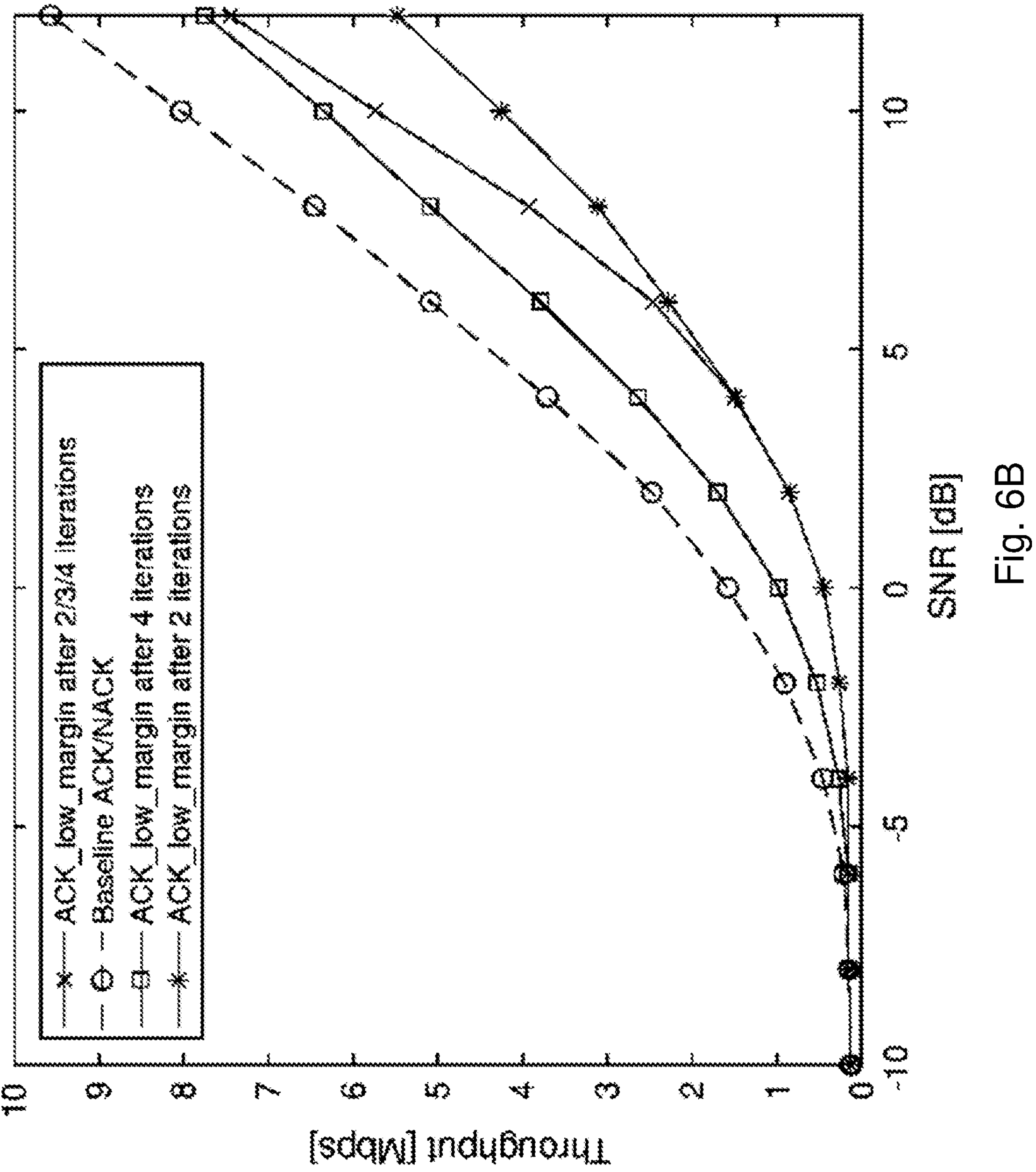

While the examples in FIGS. 5A and 5B use a wide allocation of 52 PRB, FIGS. 6A and 6B show the similar simulations with a smaller allocation size of 11 PRB. In FIGS. 6A and 6B, “x” symbols represent ACK_low_margin after 2/3/4 iterations, circles represent baseline ACK/NACK, squares represent ACK_low_margin after 4 iterations, and stars represent ACK_low_margin after 2 iterations. Here, a lower iteration threshold is needed in order to reach a low enough BLER, since the full decoding performance is achieved already after a lower average number of iterations. Also shown in FIGS. 6A and 6B are simulations, marked “2/3/4” iterations, with different iteration thresholds: 2 iterations for QPSK, 3 for 16QAM and 4 for 64QAM.

FIGS. 6A and 6B show resulting BLER and throughput after triggering outer loop on decoding success after a limited number of decoding iterations. In these examples, 11 PRB allocation and outer-loop target rate of 1% are used. If the outer loop is triggered before the decoder is finished decoding, the resulting BLER will decrease.

TABLE 5

Link-level simulation assumptions

| Parameters | Value |
|---|---|
| Carrier frequency | 4 GHz |
| Channel model | TDL-C, 300 ns |
| SCS | 30 kHz |
| BS antenna configuration | 4 Tx |
| UE antenna configuration | 2 Rx |
| Number of layers | 1 |
| MCS table | MCS index table 3 for PDSCH |
| CQI table | 4-bit CQI table 3 |
| Allocation size | 52 PRB or 11 PRB |

Counting Flipped Bits Before and After Decoder.

In another embodiment, the number of bits that is flipped after the decoder of the UE 10 is counted. Here the bits of interest may be bits in one or more code blocks. It can also be only systematic bits, only parity bits, or a combination between these. The bits of interest may also be only a limited number of bits, specified by certain min or max indices, or corresponding to certain rows or columns in matrices used in the code construction, used e.g. in the LDPC code definitions.

Both an absolute number of flipped bits may be used, as well as a relative number of bits, such as number of flipped bits in relation to a total number of bits of interest.

Instead of only looking at actual bit flips, i.e., signs of actual soft values, the amount of change of soft values can be measured. Examples may be a sum, mean or variance of difference between soft values before and after the decoder.

Re-Encoding of Received Data.

In some embodiments, after a successful decoding, the UE 10 may re-encode the successfully decoded data, using the same coding configuration as the just received reception. Then, the received soft values may be compared to a clean, encoded signal, and a measure of the SINR may be obtained. This measure of the SINR may then give an indication of how much margin there was in the decoding.

Soft Values, Log-Likelihood Ratios.

In one embodiment, the statistics, e.g., variance, correlation, mean, maximum, etc., of soft values or log-likelihood ratios is examined to generate a measure of the decoding margin.

Methods to Quantify Decoding Margin.

The methods in the above description refer to different ways of estimating the decoding margin by the UE 10. They all have in common that they compare a metric to one or more thresholds, in order to decide whether to send high or low margin ACK.

As the resulting BLER, when operating with an outer loop, is dependent on both an event rate used in the outer loop, as well as a difference between the low/high margin threshold and a point where the decoding fails, the UE 10 may calculate the low/high margin threshold based on network input.

In some embodiments, the network, i.e. the radio network node 12, configures the UE 10 with a target resulting BLER, and the target rate used in the outer loop. Based on this difference, the UE 10 may set the threshold.

In some embodiments, the radio network node 12 configures the difference between the target BLER and outer loop target rate, and this configured value is used by the UE 10, without needing to know the two independent values.

In some embodiments, the radio network node 12 configures the UE 10 with a desired SINR offset. Then the UE 10 may put the threshold between low and high margin ACK such that, on average, gives this SINR offset to the decoding limit. In a variant of these embodiments, the SINR offset may be achieved with a certain probability.

All configured values may be given as RRC configuration, by DCI messages, fixed values, or by look-up tables.

In some embodiments, there are multiple configured values, representing one or more out of:

- Number of layers,
- Modulation orders,
- Transport block sizes,
- Code rates,
- Redundancy versions, and
- Sizes of time/frequency allocation.

Method for Determining Impairment for Multi-Level HARQ-ACK.

In this embodiment, the UE 10 is configured with a SINR_offset and a BLEP_threshold. Based on SINR_offset, BLEP_threshold and the MCS used for the PDSCH, the UE 10 determines an impairment, e.g. a number of iterations to be used to calculate a soft-HARQ-ACK. The UE 10 thus determines two HARQ-ACKs, first HARQ-ACK determined without the impairment, i.e., a legacy HARQ-ACK, and second HARQ-ACK determined with the impairment. For example, if the impairment is with respect to a number of decoding iterations, then if the impairment is determined to $n \leq n_{max}$, where $n_{max}$ is the maximum number of iterations the UE 10 will use, the impairment-HARQ-ACK is determined as ACK if decoding was successful after n iterations, otherwise impairment-HARQ-ACK is determined as NACK. If both the legacy HARQ-ACK and impairment-HARQ-ACK are ACK, then ACK-high-margin is reported; if legacy HARQ-ACK but not impairment-HARQ-ACK is ACK, then ACK-low-margin is reported.

For a given MCS, the BLEP becomes worse with the impairment than without the impairment. For example, fewer number of decoding iterations lead to a higher BLEP for a given SINR value as illustrated in FIG. 7.

Figure 7:
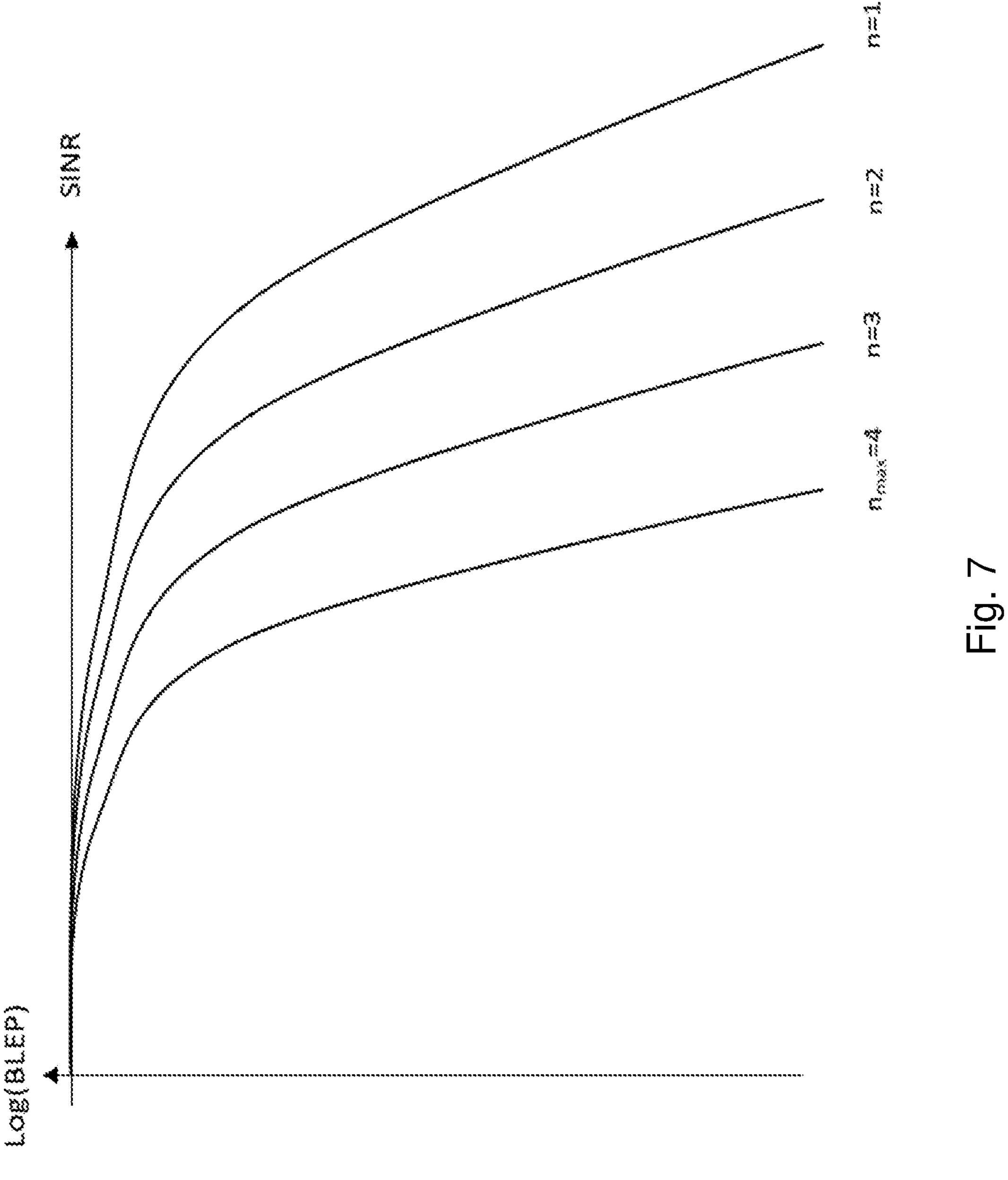
FIG. 7 is an illustration of a logarithm of BLEP as a function of SINR for different number of decoding iterations, according to some embodiments herein.

FIG. 7 is an illustration of a logarithm of BLEP as a function of SINR for different number of decoding iterations.

If the slope for impairment curve is less or equal to the curve without impairment, then maintaining a certain SINR margin to decoding error with impairment will ensure at least the same margin without the impairment. Thus, by adjusting MCS such that BLER=x with impairment will ensure the SINR margin to reach BLER=x without impairment and for any BLER=y<x with impairment there is at least the SINR margin to reach BLER=y without impairment.

Figure 8:
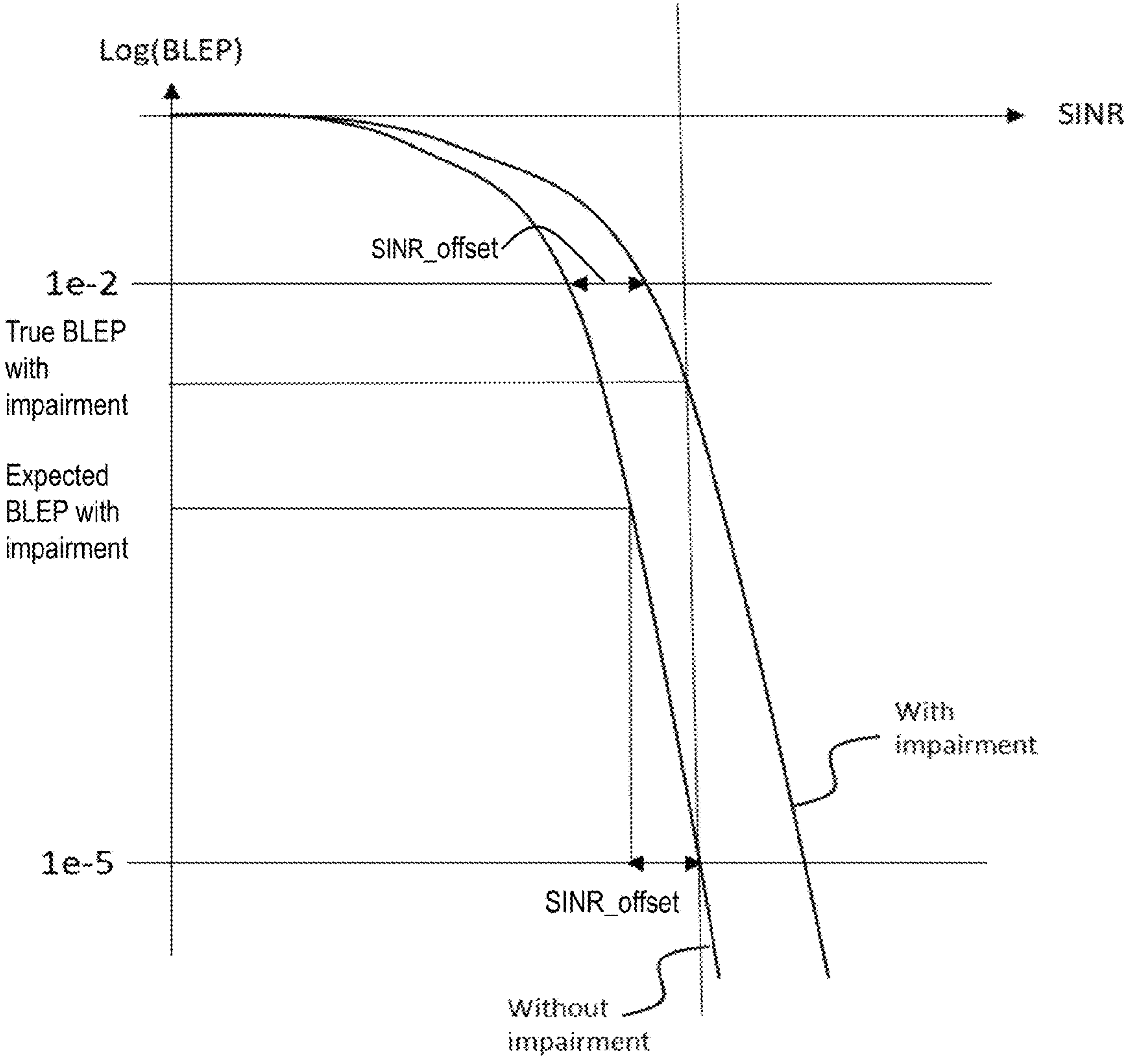
FIG. 8 is an illustration of BLEP as a function of SINR, showing how BLEP with impairment can be underestimated, according to some embodiments herein.

The gNB, e.g., the radio network node 12, may configure the UE 10 with a BLEP_threshold of, e.g., 1e-2 and a SINR_offset. In link adaption, gNB may target e.g. BLEP=1e-5 without impairment and based on a coding model of UE decoding capability, gNB may deduce that without impairment the expected BLEP would be x if SINR reduced by SINR_offset. If x<BLEP_threshold, then the impairment BLEP is not lower than x; it is likely higher due to that the slope for impairment curve is lower than the curve without impairment as illustrated in FIG. 8. Hence, making adjustment in the outer-loop based on the impairment-HARQ-ACK where outer-look use x as the target BLER. More precisely, the outer-loop uses adjustment steps based on impairment-HARQ-ACK, where at least one of ACK-step and NACK-step depends on the expected BLEP x. For example, the NACK step can be A*(1−x), while ACK step may be −A*x if outer-loop controls a SINR back-off. Since true BLEP with impairment is higher than the expected BLEP, this will cause the outer-loop to enforce a SINR margin resulting in that BLER without impairment will be lower than the target BLEP=1e-5.

FIG. 8 shows an illustration how BLEP with impairment can be underestimated.

Based on implemented decoding algorithms, the UE 10 may have access to decoding performance curves, which can assist in selecting the correct levels of impairments.

Method for Constructing Multi-Level HARQ-ACK.

Typically, the multi-level HARQ-ACK feedback is provided by the UE, such as the UE 10, to the gNB, such as the radio network node 12, on the outcome of downlink data reception, and this is used as an example in the discussion below. It is understood that the same methods may be applied to any pair of wireless nodes that are engaged in communication with each other, for example:

- HARQ-ACK for uplink: the HARQ-ACK feedback is provided by the gNB to the UE on the outcome of uplink data reception; or
- HARQ-ACK for sidelink: the HARQ-ACK feedback is provided by one UE (UE #1) to another UE (UE #2) on the outcome of data packet(s) reception, where the data packet(s) was sent from UE #2 to UE #1; or
- HARQ-ACK for relay link or backhaul link: the HARQ-ACK feedback is provided by one network node (node #1) to another network node (node #2) on the outcome of data packet(s) reception, where the data packet(s) was sent from node #2 to node #1.

Instead of 1-bit HARQ-ACK, n-bit HARQ-ACK is constructed and provided as the feedback. Instead of 2 values, e.g., '0' for NACK and '1' for ACK, provided by 1-bit HARQ-ACK, n-bit HARQ-ACK has $2^n$ values where n is an integer greater than or equal to 2. Multi-level HARQ-ACK allows the receiver to provide richer feedback to the sender of data packet or packets. A mapping table is provided to code the meaning of the $2^n$ values of multi-level HARQ-ACK when n>1. The system may choose to use the (n=1)-bit HARQ-ACK or the (n>1)-bit HARQ-ACK. A higher-layer parameter can be used to indicate the feedback mode (n=1 vs n>1). The higher-layer parameter can be an RRC parameter, a MAC parameter, or a combination of RRC and MAC indicators.

In one embodiment, the multi-level HARQ-ACK can be a composite of ACK/NACK and CSI feedback. An example of the mapping table is shown in Table 6 for 2-bit HARQ-ACK feedback, n=2, and $2^n$=4 values. In addition to ACK/NACK which acknowledges a data packet reception, or a group of data packets, the HARQ-ACK also conveys CSI feedback delta_MCS. The delta_MCS is the UE recommendation of MCS change for future data scheduling, as compared to a reference MCS value. A typical example of the reference MCS value $MCS_a$ is the MCS of the PDSCH(s) being acknowledged (i.e., ACK-ed or NACK-ed), and $MCS_b$ is for future data packet(s) scheduled on (approximately) the same frequency resources. Other MCS interpretation can be used as well, for example, the reference MCS value $MCS_a$ is the medium MCS level among several MCS levels used by a group of PDSCH(s) being acknowledged, and $MCS_b$ is the medium MCS level for the several MCS levels of a group of future PDSCHs.

While example values for delta_MCS ($d_0$, $d_1$, $d_2$, $d_3$) are provided in Table 6 for illustration purpose, other values can be used as well. For example, ($d_0$=−2, $d_1$=0, $d_2$=0, $d_3$=1). If $MCS_a$ is already the lowest MCS level in the relevant MCS table, then feedback value j with $d_j$<0 (jε{0, 1, 2, 3}) indicates that bigger change than lowering MCS level is recommended to achieve reliable data transmission, e.g., change the MCS table to one containing lower MCS values, adding data packet repetitions, reduction of multiple input multiple output (MIMO) rank, precoding matrix change, etc. Similarly, if $MCS_a$ is already the highest MCS level in the relevant MCS table, then feedback value j with $d_j$>0 indicates that bigger change than increasing MCS level is recommended, e.g., change the MCS table to one containing higher MCS values, reducing data packet repetitions, increase of MIMO rank, precoding matrix change, etc.

While Table 6 focuses on MCS level as UE feedback, the delta_MCS can be interpreted more broadly. In one example, instead of providing feedback on MCS=Q*R, the delta_MCS provides feedback on the composite modulation and coding rate, MCS', which also takes into account the number of repetitions. That is, MCS'=Q*R/Nrep, where Q is the modulation order, R is the coding rate, and Nrep is the number of repetitions of the data packet.

TABLE 6

Mapping table for n = 2 bit HARQ-ACK feedback that provides CSI in addition to ACK/NACK

| 2-bit HARQ-ACK feedback value | Information provided: Feedback on data packet reception | Information provided: Feedback on CQI/MCS (delta_MCS) | Explanation |
|---|---|---|---|
| 00 | NACK | $d_0$ | NACK: The data packet(s) was not successfully received; Delta_MCS = $d_0$: recommend to schedule future data packet(s) with MCS level $MCS_b$ = $MCS_a$ + $d_0$. Typical value of $d_0$ is $d_0$ = −1, i.e., recommend to schedule using the MCS one level below the reference value $MCS_a$. |
| 01 | NACK | $d_1$ | NACK: The data packet(s) was not successfully received; Delta_MCS = $d_1$: recommend to schedule future data packet(s) with MCS level $MCS_b$ = $MCS_a$ + $d_1$. Typical value of $d_1$ is $d_1$ = 0, i.e., recommend to schedule using MCS the same as the reference value $MCS_a$. |
| 10 | ACK | $d_2$ | ACK: The data packet(s) was successfully received; Delta_MCS = $d_2$: recommend to schedule future data packet(s) with MCS level $MCS_b$ = $MCS_a$ + $d_2$. Typical value of $d_2$ is $d_2$ = 0, i.e., recommend to schedule using MCS the same as the reference value $MCS_a$. |
| 11 | ACK | $d_3$ | ACK: The data packet(s) was successfully received; Delta_MCS = $d_2$: recommend to schedule future data packet(s) with MCS level $MCS_b$ = $MCS_a$ + $d_3$. Typical value of $d_2$ is $d_2$ = +1, i.e., recommend to schedule using the MCS one level above the reference value $MCS_a$. |

While Table 6 shows a preferred example with equal number (two) of HARQ-ACK values associated with NACK vs ACK, other variations can be used as well. For example, a mapping table where three HARQ-ACK values associated with NACK, and one HARQ-ACK values associated with ACK. In another example, a mapping table where four HARQ-ACK values associated with NACK, and no HARQ-ACK value associated with ACK, where absence of HARQ-ACK response indicates ACK. Table 7 shows one example where three HARQ-ACK are values associated with ACK, and one HARQ-ACK value associated with NACK.

UE obtains delta_MCS based on its demodulation/decoding of current PDSCH(s). Exactly how to determine is up to UE implementation. For example, the UE may use any of the methods described earlier for estimation of decoding margin.

TABLE 7

Mapping table for n = 2 bit HARQ-ACK feedback that provides CSI in addition to ACK/NACK

| 2-bit HARQ- | Information provided | | |
|---|---|---|---|
| ACK feedback value | Feedback on data packet reception | Feedback on CQI/MCS (delta_MCS) | Explanation |
| 00 | NACK | $d_0$ | NACK: The data packet(s) was not successfully received; Delta_MCS = $d_0$: recommend to schedule future data packet(s) with MCS level $MCS_b = MCS_a + d_0$. Typical value of $d_0$ is $d_0 = -1$, i.e., recommend to schedule using the MCS one level below the reference value $MCS_a$. |
| 01 | ACK | $d_1$ | ACK: The data packet(s) was successfully received; Delta_MCS = $d_1$: recommend to schedule future data packet(s) with MCS level $MCS_b = MCS_a + d_1$. Typical value of $d_1$ is $d_1 = -1$, i.e., recommend to schedule using MCS one level below the reference value $MCS_a$, to increase robustness although packed was successfully received. |
| 10 | ACK | $d_2$ | ACK: The data packet(s) was successfully received; Delta_MCS = $d_2$: recommend to schedule future data packet(s) with MCS level $MCS_b = MCS_a + d_2$. Typical value of $d_2$ is $d_2 = 0$, i.e., recommend to schedule using MCS the same as the reference value $MCS_a$, to maintain robustness. |
| 11 | ACK | $d_3$ | ACK: The data packet(s) was successfully received; Delta_MCS = $d_2$: recommend to schedule future data packet(s) with MCS level $MCS_b = MCS_a + d_3$. Typical value of $d_2$ is $d_2 = +1$, i.e., recommend to schedule using the MCS one level above the reference value $MCS_a$, to reduce excessive robustness. |

In another embodiment, the multi-level HARQ-ACK provides acknowledgement of data packet(s) reception as well as control data reception. An example of the mapping table is shown in Table 8 for 2-bit HARQ-ACK feedback, n=2, and $2^n$=4 values. In addition to ACK/NACK which acknowledges a data packet reception (or a group of data packets), the HARQ-ACK also conveys feedback about downlink control channel (PDCCH) reception. Specifically, the feedback about PDCCH reception is in the format of delta_IndexAL, which provides the UE's recommendation of aggregation level (AL) to use in future PDCCH transmission, assuming the DCI size is approximately the same as the DCI size associated with the reference aggregation level $AL_a$. The delta_IndexAL is the aggregation level index change as compared to the index of the reference AL value $AL_a$. In NR Rel-15 and Rel-16, 5 indices of AL are supported, with index_AL=0, 1, . . . , 5 indicating aggregation levels AL=1, 2, 4, 8, 16, respectively. A typical example of the reference $AL_a$ is the AL used to schedule the PDSCH(s) being acknowledged, i.e., ACK-ed or NACK-ed. Other interpretation can be used as well, for example, the reference AL value $AL_a$ is the medium AL level among several AL levels of the PDCCH(s) associated with a group of PDCSH(s) being acknowledged, and $AL_b$ is the medium AL to be used by future PDCCHs when scheduling PDSCHs.

While example values for delta_IndexAL ($d_0$=−1, $d_1$=0, $d_2$=−1, $d_3$=0) are provided in Table 8 for illustration purpose, other values can be used as well. For example, ($d_0$=−2, $d_1$=0, $d_2$=−1, $d_3$=0). If $AL_a$ is already the lowest AL (AL=1), then feedback value j with $d_j$<0 (jε{0, 1, 2, 3}) indicates that bigger change than lowering AL is recommended if gNB wishes to achieve higher efficiency in PDCCH transmission, e.g., gNB can use DCI of a bigger size, use a different antenna port, etc. Similarly, if $AL_a$ is already the highest AL (AL=16 for Rel-15 and Rel-16), then feedback value j with $d_j$>0 (jε{0, 1, 2, 3}) indicates that bigger change than increasing aggregation level is recommended to achieve higher PDCCH reliability, e.g., reducing DCI size, change the antenna port to send the PDCCH, joint transmission of PDCCH with multiple transmission points, etc.

TABLE 8

Mapping table for n = 2 bit HARQ-ACK feedback that provides feedback on downlink control channel reception in addition to ACK/NACK

| 2-bit HARQ-ACK feedback value | Information provided: Feedback on data packet reception | Information provided: Feedback on DL control channel reception (delta_AL) | Explanation |
|---|---|---|---|
| 00 | NACK | $d_0$ | NACK: The data packet(s) was not successfully received; Delta_IndexAL = $d_0$: recommend to schedule future PDCCH with $IndexAL_b = IndexAL_a + d_0$. Typical value of $d_0$ is $d_0 = -1$, i.e., recommend to schedule using the AL one level below the reference $AL_a$. |
| 01 | NACK | $d_1$ | NACK: The data packet(s) was not successfully received; Delta_IndexAL = $d_1$: recommend to schedule future PDCCH with $IndexAL_b = IndexAL_a + d_1$. Typical value of $d_1$ is $d_1 = 0$, i.e., recommend to schedule using the same AL as the reference $AL_a$. |
| 10 | ACK | $d_2$ | ACK: The data packet(s) was successfully received; Delta_IndexAL = $d_2$: recommend to schedule future PDCCH with $IndexAL_b = IndexAL_a + d_2$. Typical value of $d_2$ is $d_2 = -1$, i.e., recommend to schedule using the AL one level below the reference $AL_a$. |
| 11 | ACK | $d_3$ | ACK: The data packet(s) was successfully received; Delta_IndexAL = $d_3$: recommend to schedule future PDCCH with $IndexAL_b = IndexAL_a + d_3$. Typical value of $d_3$ is $d_3 = 0$, i.e., recommend to schedule using the same AL as the reference $AL_a$. |

Furthermore, the mapping table can be constructed such that it includes information about both MCS and AL, in addition to HARQ-ACK. One example is illustrated in Table 9 below.

TABLE 9

Mapping table for n = 2 bit HARQ-ACK feedback that provides CSI and AL feedback in addition to ACK/NACK

| 2-bit HARQ-ACK feedback value | Information provided |
|---|---|
| 00 | NACK, delta_MCS = −1, delta_IndexAL = −1 |
| 01 | ACK, delta_MCS = −1, delta_IndexAL = −1 |
| 10 | ACK, delta_MCS = −1, delta_IndexAL = 0 |
| 11 | ACK, delta_MCS = 0, delta_IndexAL = 0 |

Method for Efficient Transmission of Multi-Level HARQ-ACK.

When using n-bit (n>1) HARQ-ACK in a straightforward manner, the HARQ-ACK codebook size is n times as large as 1-bit HARQ-ACK. Regardless of HARQ-ACK codebook type (Type 1, Type 2, Type 3 in Rel-16), typically, a HARQ-ACK codebook provides feedback for reception of numerous PDSCHs, spanning several dimensions such as serving cells, time, MIMO layers. Thus, it can be excessive if the HARQ-ACK codebook size increase to n times, n>2.

To reduce HARQ-ACK feedback payload burden, condensation of feedback information is useful.

In one example according to embodiments herein, the information beyond hard ACK/NACK, e.g., delta_MCS, delta_IndexAL, etc., is provided per group of PDSCH, instead of per individual PDSCH. For instance, all PDSCHs in a same serving cell are provided with 1 bit to indicate information beyond hard ACK/NACK. Alternatively, all PDSCHs that belong to a same time duration (e.g., duration=1 slot, or duration=the slots that contain consecutive DL slots in a TDD U/D pattern, etc.) are provided with 1 bit to indicate information beyond hard ACK/NACK. Methods like these can be used individually or jointly.

In another example according to embodiments herein, the multi-level HARQ-ACK is only applied to certain HARQ-ACK codebook type or types, and not applied to other codebook type or types. For example, a gNB such as the radio network node 12 may configure the UE 10 that Type 2 codebook can use 1-bit HARQ-ACK mode or n-bit HARQ-ACK mode (n>1), and do not allow n-bit HARQ-ACK mode to codebook Type 1 and Type 3.

In another example according to embodiments herein, the multi-level HARQ-ACK is only applicable to certain BWPs or serving cells, for example, where the URLLC traffic is being served. BWPs or serving cells that do not need expanded HARQ-ACK feedback may not be configured with multi-level HARQ-ACK.

It is also noted that generating multi-level HARQ-ACK is more complicated than 1-bit HARQ-ACK for the UE implementation. Hence, the UE 10 may report its capability of generating multi-level HARQ-ACK. This capability may be a function of SCS, band, band combination, etc. In response to UE's capability reporting, the gNB, e.g., the radio network node 12, may configure multi-level HARQ-ACK if and where the UE 10 is capable of the reporting.

Figure 9:
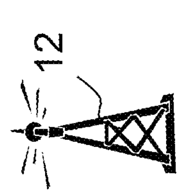
FIG. 9 shows a block diagram depicting embodiments of a UE according to embodiments herein.
Figure 9:
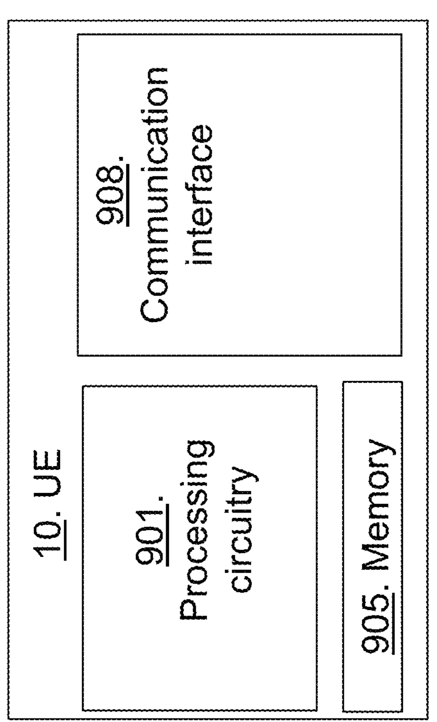
Figure 9:
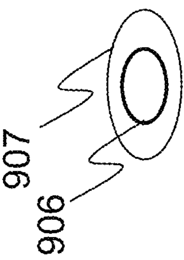

FIG. 9 is a block diagram depicting the UE 10, in two embodiments, for handling communication in the wireless communications network 1 according to embodiments herein.

The UE 10 may comprise processing circuitry 901, e.g. one or more processors, configured to perform the methods herein.

The UE 10 may comprise a receiving unit 902, e.g. a receiver or transceiver. The UE 10, the processing circuitry 901, and/or the receiving unit 902 may be configured to receive configuration data from the radio network node 12 for handling communication. Thus, the UE 10 may be configured by the radio network node 12 or be preconfigured with a number of different settings and/or indications of threshold to be used to determine type of ACK/NACK. The UE 10, the processing circuitry 901, and/or the receiving unit 902 is configured receive, from a radio network node 12, the configuration data comprising one or more settings used to determine a decoding margin for determining a type of an ACK or NACK message from multi-level ACK or NACK messages. The one or more settings comprise one or more of: a target BLER, an outer loop target rate, a difference between the target BLER and the outer loop target rate, and a SINR offset.

The UE 10 may comprise a determining unit 903. The UE 10, the processing circuitry 901, and/or the determining unit 903 may be configured to determine the type of the ACK or NACK message, or ACK/NACK, to use out of multilevel ACKs/NACKs, based on the determined decoding margin. ACK may be transmitted upon successful decoding and it is reported using two or more levels, based on estimated decoding margin and the UE may select between two or more levels based on a threshold. A setting from the one or more settings may be compared to a respective threshold to determine the decoding margin. The threshold may be calculated based on configured reliability metrics. The reliability metrics may be one or more of: SNR offset, SINR offset, target BLER or BLEP, target outer loop BLER or BLEP, etc.

The UE 10, the processing circuitry 901, and/or the determining unit 903 may be configured to determine the threshold based on the difference between the target BLER and the outer loop target rate. The UE 10, the processing circuitry 901, and/or the determining unit 903 may be configured to determine the threshold such that the threshold is the difference between the target BLER and the outer loop target rate.

The UE 10, the processing circuitry 901, and/or the determining unit 903 may be configured to determine the decoding margin based on the SINR offset and the target BLER. The UE 10, the processing circuitry 901, and/or the determining unit 903 may be further configured to:

- determine an impairment comprising a number of n decoding iteration used to decode the transport block;
- determine a first HARQ-ACK message determined without the impairment and a second HARQ-ACK message determined with the impairment, wherein:
  - if the impairment is determined to be $n \leq n_{max}$, where $n_{max}$ is the maximum number of iterations the UE (10) uses:
    - the second HARQ-ACK message is determined as ACK if decoding is successful after n iterations; and
    - the second HARQ-ACK message is determined as NACK if decoding is not successful after n iterations;
- if both the first HARQ-ACK message and the second HARQ-ACK message are determined as ACK, determine the ACK or NACK message comprising a high margin ACK message; and
- if the first HARQ-ACK message is determined as ACK while the second HARQ-ACK message is determined as not ACK, determine the ACK or NACK message comprising a low margin ACK message.

The UE 10 may comprise a transmitting unit 904, e.g. a transmitter or a transceiver. The UE 10, the processing circuitry 901 and/or the transmitting unit 904 may be configured to transmit multilevel ACK/NACK e.g. as determined. The UE 10, the processing circuitry 901 and/or the transmitting unit 904 is configured to transmit, to the radio network node 12, the ACK or NACK message of the type for a received transport block, wherein the ACK or NACK message is of the type determined based on the received configuration data.

The UE 10, the processing circuitry 901 and/or the transmitting unit 904 may be further configured to transmit, to the radio network node 12, the ACK or NACK message by:

- transmitting the ACK or NACK message comprising a high margin ACK message if successful decoding of the transport block is obtained before a certain number of iterations; and
- transmitting the ACK or NACK message comprising a low margin ACK message if successful decoding of the transport block is obtained after the certain number of iterations.

The UE 10, the processing circuitry 901 and/or the transmitting unit 904 may be further configured to transmit, to the radio network node 12, the ACK or NACK message along with a CSI feedback comprising a recommendation of MCS change for scheduling of a further transport block; or transmit, to the radio network node 12, the ACK or NACK message along with feedback about PDCCH reception.

The UE 10, the processing circuitry 901 and/or the transmitting unit 904 may be further configured to transmit, to the radio network node 12, information on capability of the UE (10) to generate the multi-level ACK or NACK messages. The UE 10, the processing circuitry 901, and/or the receiving unit 902 may further be configured to receive, from the radio network node 12, the configuration data based on the transmitted information on the capability of the UE 10 to generate the multi-level ACK or NACK messages.

The UE 10 may comprise a memory 905. The memory 905 comprises one or more units to be used to store data on, such as data packets, thresholds, signal strengths/qualities, measurements, multilevel ACK/NACKs definitions, events and applications to perform the methods disclosed herein when being executed, and similar. Furthermore, the UE 10 may comprise a communication interface 908 such as comprising a transmitter, a receiver, a transceiver and/or one or more antennas.

The methods according to the embodiments described herein for the UE 10 are respectively implemented by means of e.g. a computer program product 906 or a computer program, comprising instructions, i.e., software code portions, which, when executed on at least one processor, cause the at least one processor to carry out the actions described herein, as performed by the UE 10. The computer program product 906 may be stored on a computer-readable storage medium 907, e.g. a disc, a universal serial bus (USB) stick or similar. The computer-readable storage medium 907, having stored thereon the computer program product, may comprise the instructions which, when executed on at least one processor, cause the at least one processor to carry out the actions described herein, as performed by the UE 10. In some embodiments, the computer-readable storage medium may be a transitory or a non-transitory computer-readable storage medium. Thus, embodiments herein may disclose a UE 10 for handling communication in a wireless communications network, wherein the UE 10 comprises processing circuitry and a memory, said memory comprising instructions executable by said processing circuitry whereby said UE 10 is operative to perform any of the methods herein.

Figure 10:
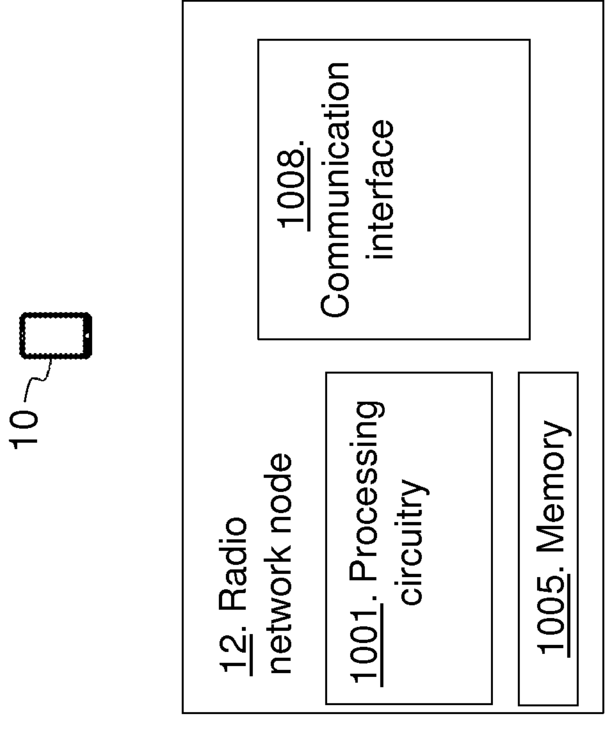
FIG. 10 shows a block diagram depicting embodiments of a radio network node according to embodiments herein.
Figure 10:
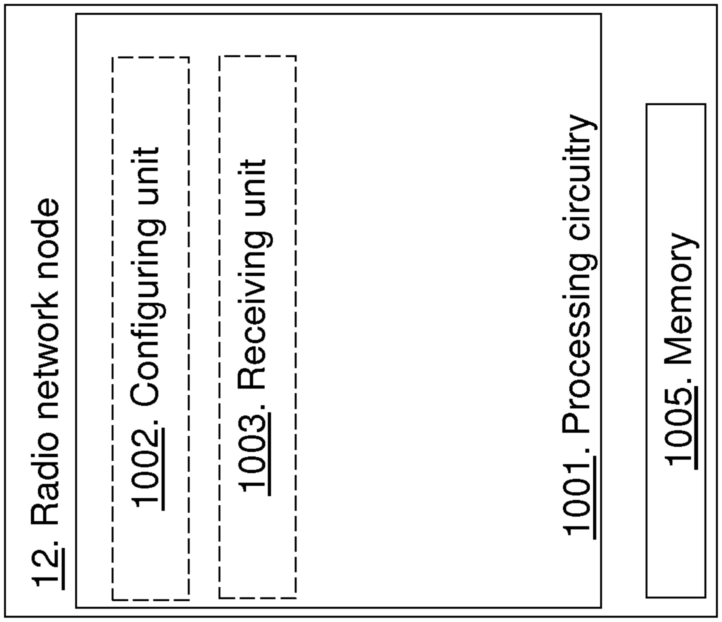

FIG. 10 is a block diagram depicting the radio network node 12 in two embodiments for handling communication in the wireless communications network 1 according to embodiments herein.

The radio network node 12 may comprise processing circuitry 1001, e.g. one or more processors, configured to perform the methods herein.

The radio network node 12 may comprise a configuring unit 1002, e.g. a transmitter or a transceiver. The radio network node 12, the processing circuitry 1001, and/or the configuring unit 1002 may be configured to configure the UE 10 with a number of different settings such as parameters, thresholds, and/or the like to determine when to use which level of multilevel ACK/NACK. Configuration of UE to report multi-level Ack comprises one or more out of:

- ACK upon successful decoding is reported using two or more levels, based on estimated decoding margin,
- the UE selects between two or more levels based on a threshold, and
- this threshold is calculated based on configured reliability metrics.

The reliability metrics may be one or more of: SNR offset, SINR offset, target BLER or BLEP, target outer loop BLER or BLEP.

The radio network node 12, the processing circuitry 1001, and/or the configuring unit 1002 is configured to configure the UE 10 by providing to the UE 10 the configuration data. The radio network node 12, the processing circuitry 1001, and/or the configuring unit 1002 is configured to provide, to a UE 10, the configuration data comprising one or more settings used to determine a decoding margin for determining the type of an ACK or NACK message from multi-level ACK or NACK messages, wherein the one or more settings comprise one or more of: the target BLER, an outer loop target rate, a difference between the target BLER and the outer loop target rate, and the SINR offset.

The radio network node 12 may comprise a receiving unit 1003. The radio network node 12, the processing circuitry 1001 and/or the receiving unit 1003 may be configured to receive an ACK/NACK of a level out of multilevel ACKs/NACKs. The radio network node 12, the processing circuitry 1001 and/or the receiving unit 1003 is configured to receive, from the UE 10, the ACK or NACK message of the type for a received transport block, wherein the ACK or NACK message is of the type determined based on the received configuration data.

The radio network node 12, the processing circuitry 1001 and/or the receiving unit 1003 may be configured to receive, from the UE 10, information on capability of the UE 10 to generate the multi-level ACK or NACK messages, wherein the wherein the radio network node 12, the processing circuitry 1001, and/or the configuring unit 1002 may be configured to provide, to the UE 10, the configuration data based on the received information on the capability of the UE 10 to generate the multi-level ACK or NACK messages.

The radio network node 12, the processing circuitry 1001 and/or the receiving unit 1003 may be configured to receive, from the UE 10, the ACK or NACK message along with a channel state information, CSI, feedback comprising a recommendation of modulation and coding scheme, MCS, change for scheduling of a further transport block, or receive, from the UE 10, the ACK or NACK message along with feedback about PDCCH reception.

The radio network node 12 may comprise a memory 1005. The memory 1005 comprises one or more units to be used to store data on, such as data packets, ACK/NACK configurations, settings, multilevel ACKs/NACKs, allocated resources, thresholds, events and applications to perform the methods disclosed herein when being executed, and similar. Furthermore, the radio network node may comprise a communication interface 1008 such as comprising a transmitter, a receiver, a transceiver and/or one or more antennas.

The methods according to the embodiments described herein for the radio network node 12 are respectively implemented by means of e.g. a computer program product 1006 or a computer program, comprising instructions, i.e., software code portions, which, when executed on at least one processor, cause the at least one processor to carry out the actions described herein, as performed by the radio network node 12. The computer program product 1006 may be stored on a computer-readable storage medium 1007, e.g. a disc, a universal serial bus (USB) stick or similar. The computer-readable storage medium 1007, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium. Thus, embodiments herein may disclose the radio network node 12 for handling communication in a wireless communications network, wherein the radio network node 12 comprises processing circuitry and a memory, said memory comprising instructions executable by said processing circuitry whereby said radio network node 12 is operative to perform any of the methods herein.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, gNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 11:
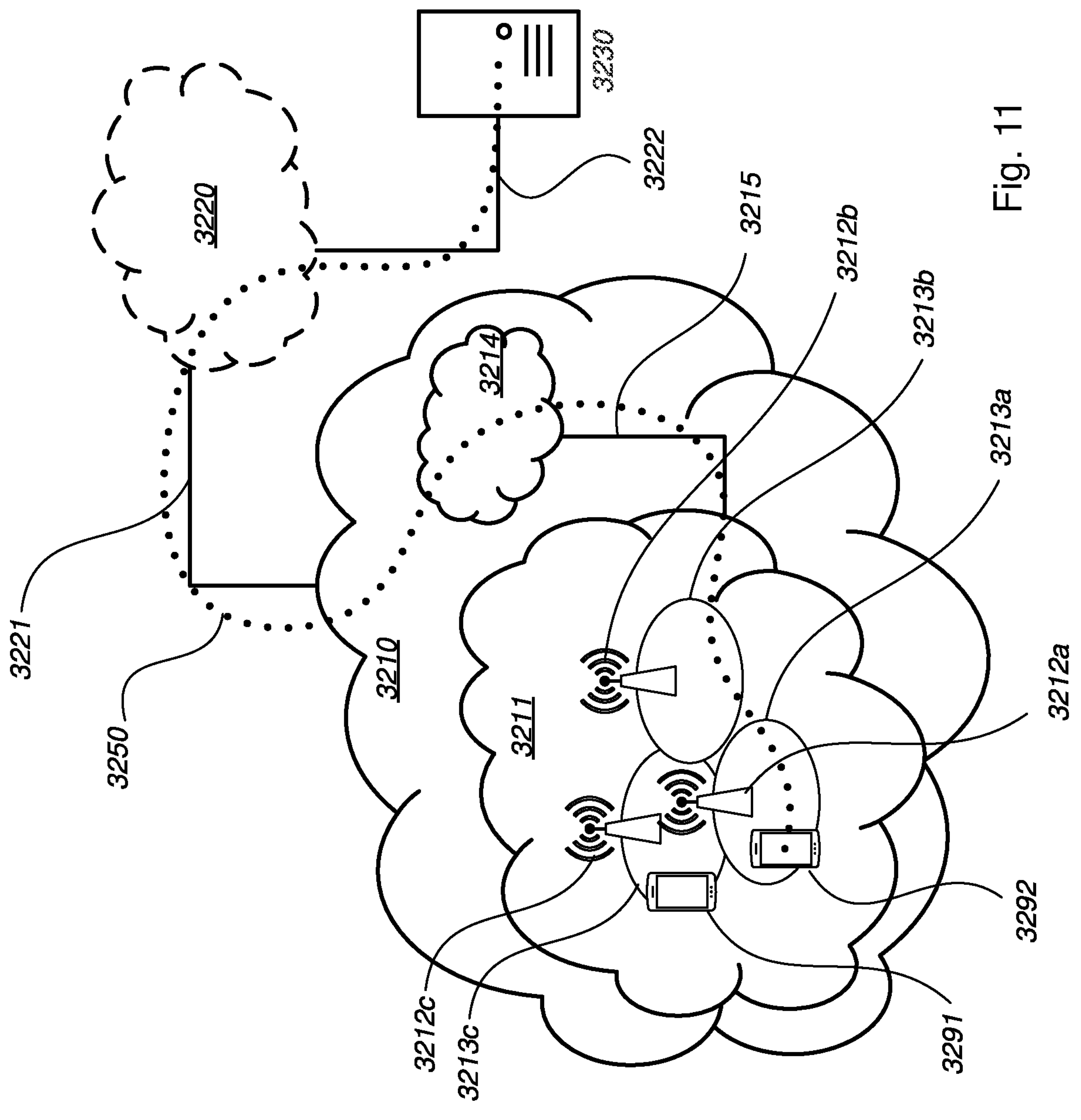
FIG. 11 schematically illustrates a telecommunication network connected via an intermediate network to a host computer.

With reference to FIG. 11, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points being examples of the radio network node 12 herein, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291, being an example of the UE 10, located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
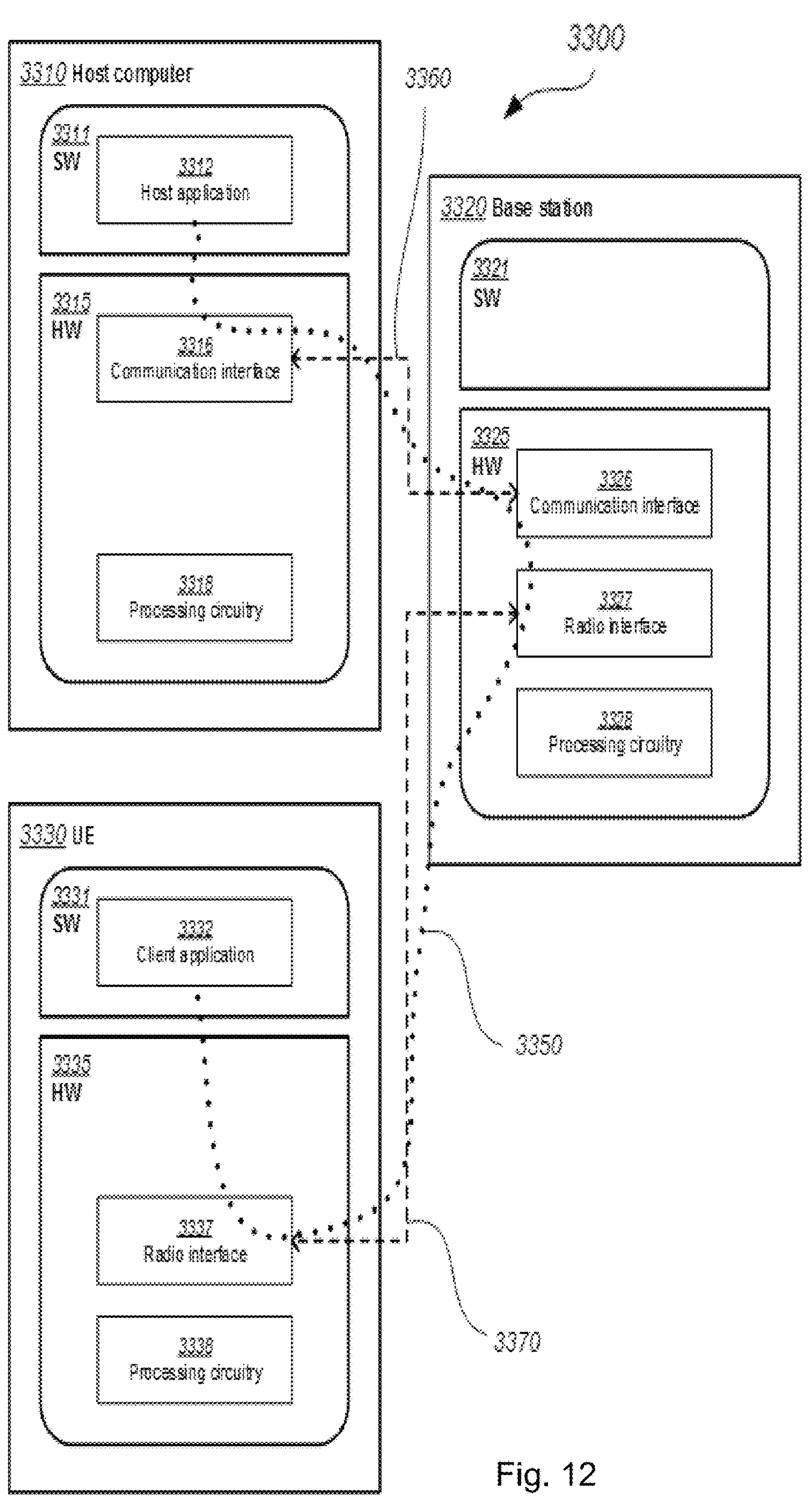
FIG. 12 is a generalized block diagram of a host computer communicating via a base station with a user equipment over a partially wireless connection.

It is noted that the host computer 3310, base station 3320 and UE 3330 illustrated in FIG. 12 may be identical to the host computer 3230, one of the base stations 3212*a*, 3212*b*, 3212*c* and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the performance since radio resource may be handled more efficiently and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 13:
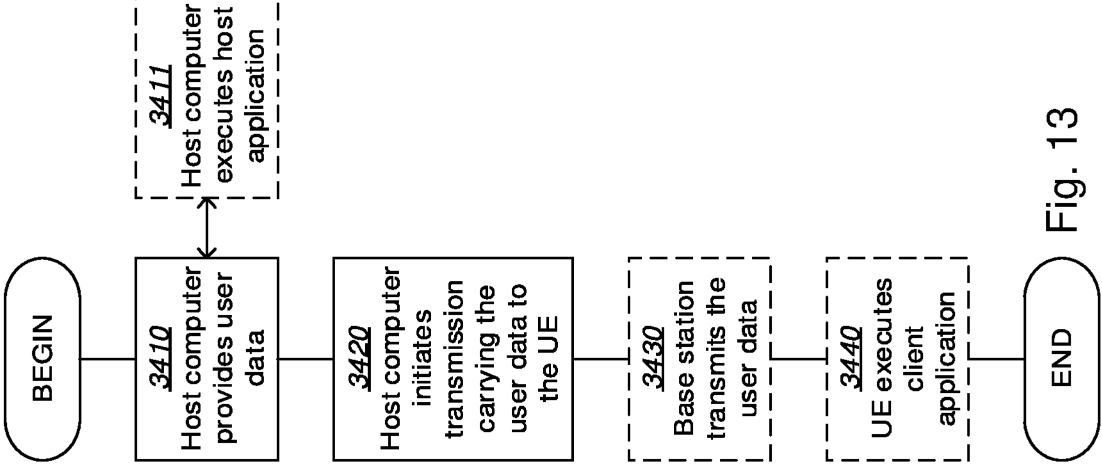

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 14:
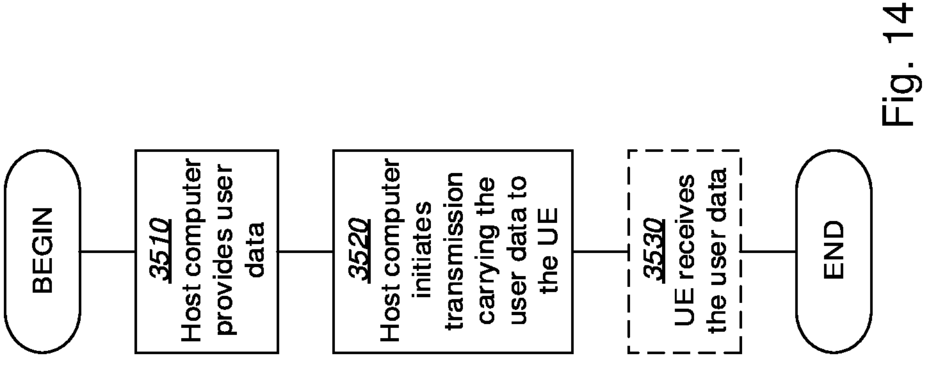
FIGS. 13, 14, 15, and 16 are flowcharts illustrating methods implemented in a communication system including a host computer, a base station and a user equipment.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 15:
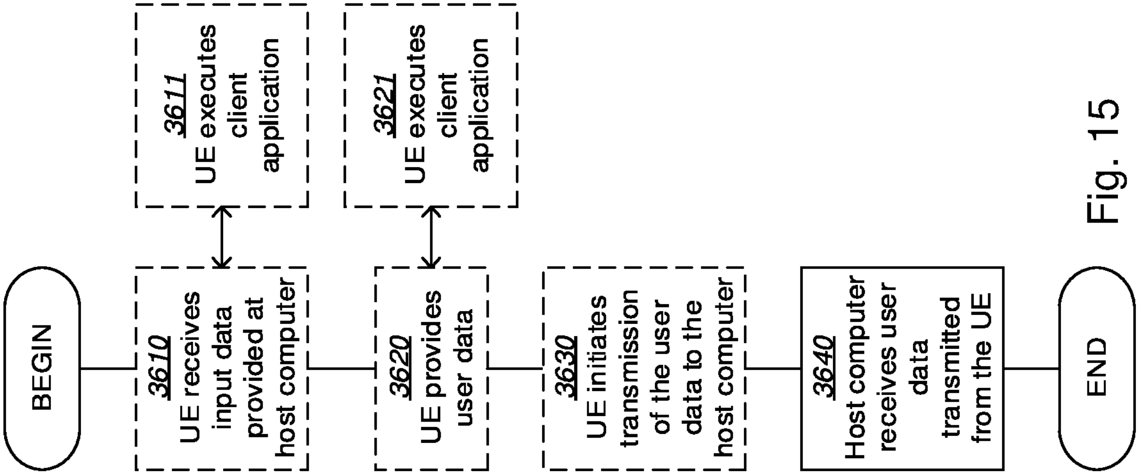

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 16:
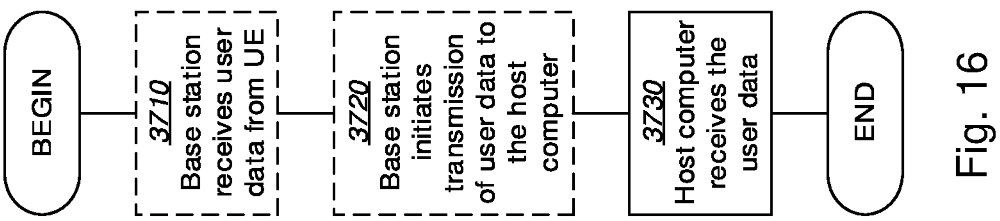

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Abbreviations

3GPP 3$^{rd}$ Generation Partnership Project
5G 5$^{th}$ Generation
ACK Acknowledgement
CE Control Element
CG Configured Grant
DCI Downlink Control Information
DL Downlink
DMRS Demodulation Reference Signal
GF Grant-Free
gNB Next Generation NodeB
ID Identity
LCH Logical Channel
LTE Long-Term Evolution
MCS Modulation and Coding Scheme
NACK No Acknowledgement
NR New Radio
PRACH Physical Random-Access Channel
PUSCH Physical Uplink Shared Channel
SNR Signal-to-Noise Ratio
SPS Semi-Persistent Scheduling
SUL Supplemental Uplink
TTI Transmission Time Interval
TO Transmission Opportunity
UE User Equipment
UL Uplink
URLLC Ultra-Reliable and Low-Latency Communications

The invention claimed is:

1. A method performed by a user equipment, UE, for handling communication in a wireless communication network, the method comprising:

receiving, from a radio network node, a configuration data comprising one or more settings used to determine a decoding margin for determining a type of an acknowledgement, ACK, or non-acknowledgement, NACK, message from multi-level ACK or NACK messages, the one or more settings comprising one or more of: a target block error ratio, BLER, an outer loop target rate, a difference between the target BLER and the outer loop target rate, and a signal-to-interference-plus-noise ratio, SINR, offset; and transmitting, to the radio network node, the ACK or NACK message of the type for a received transport block, the ACK or NACK message being of the type determined based on the received configuration data.

2. The method according to claim 1, comprising determining the type of the ACK or NACK message based on the determined decoding margin.

3. The method according to claim 2, wherein the decoding margin is determined based on the SINR offset and the target BLER, and wherein the method further comprises:

determining an impairment comprising an integer number of n decoding iteration used to decode the transport block; and determining a first HARQ-ACK message determined without the impairment and a second HARQ-ACK message determined with the impairment, wherein:

if the impairment is determined to be $n \leq n_{max}$, where $n_{max}$ is the maximum integer number of iterations the UE uses:

the second HARQ-ACK message is determined as ACK if decoding is successful after n iterations; and the second HARQ-ACK message is determined as NACK if decoding is not successful after n iterations;

if both the first HARQ-ACK message and the second HARQ-ACK message are determined as ACK, determining the ACK or NACK message comprising a high margin ACK message; and if the first HARQ-ACK message is determined as ACK while the second HARQ-ACK message is determined as not ACK, determining the ACK or NACK message comprising a low margin ACK message.

4. The method according to claim 1, wherein a setting from the one or more settings is compared to a respective threshold to determine the decoding margin.

5. The method according to claim 4, wherein the threshold is determined using reliability metrics comprising one or more of: a signal-to-noise ratio (SNR) offset, the SINR offset, the target BLER, and a target block-error probability, BLEP.

6. The method according to claim 4, wherein the threshold is determined based on the difference between the target BLER and the outer loop target rate.

7. The method according to claim 4, wherein the threshold is the difference between the target BLER and the outer loop target rate.

8. The method according to claim 1, wherein transmitting, to the radio network node, the ACK or NACK message comprises:

transmitting the ACK or NACK message comprising a high margin ACK message if successful decoding of the transport block is obtained before a certain number of iterations; and transmitting the ACK or NACK message comprising a low margin ACK message if successful decoding of the transport block is obtained after the certain number of iterations.

9. The method according to claim 1, further comprising:

transmitting, to the radio network node, the ACK or NACK message along with a channel state information, CSI, feedback comprising a recommendation of modulation and coding scheme, MCS, change for scheduling of a further transport block; or transmitting, to the radio network node, the ACK or NACK message along with feedback about downlink control channel, PDCCH, reception.

10. The method according to claim 1, further comprising:

transmitting, to the radio network node, information on capability of the UE to generate the multi-level ACK or NACK messages; and receiving, from a radio network node, the configuration data based on the transmitted information on the capability of the UE to generate the multi-level ACK or NACK messages.

11. A method performed by a radio network node for handling communication in a wireless communications network, the method comprising:

providing, to a user equipment, UE, a configuration data comprising one or more settings used to determine a decoding margin for determining a type of an acknowledgement, ACK, or non-acknowledgement, NACK, message from multi-level ACK or NACK messages, the one or more settings comprising one or more of: a target block error ratio, BLER, an outer loop target rate, a difference between the target BLER and the outer loop target rate, and a signal-to-interference-plus-noise ratio, SINR, offset; and receiving, from the UE, the ACK or NACK message of the type for a received transport block, the ACK or NACK message being of the type determined based on the received configuration data.

12. The method according to claim 11, further comprising:

receiving, from the UE, information on capability of the UE to generate the multi-level ACK or NACK messages; and providing, to the UE, the configuration data based on the received information on the capability of the UE to generate the multi-level ACK or NACK messages.

13. The method according to claim 11, further comprising:

receiving, from the UE, the ACK or NACK message along with a channel state information, CSI, feedback comprising a recommendation of modulation and coding scheme, MCS, change for scheduling of a further transport block; or receiving, from the UE, the ACK or NACK message along with feedback about downlink control channel, PDCCH, reception.

14. A user equipment, UE, for handling communication in a wireless communication network, the UE comprising processing circuitry configured to:

receive, from a radio network node, a configuration data comprising one or more settings used to determine a decoding margin for determining a type of an acknowledgement, ACK, or non-acknowledgement, NACK, message from multi-level ACK or NACK messages, the one or more settings comprising one or more of: a target block error ratio, BLER, an outer loop target rate, a difference between the target BLER and the outer loop target rate, and a signal-to-interference-plus-noise ratio, SINR, offset; and transmit, to the radio network node, the ACK or NACK message of the type for a received transport block, the ACK or NACK message being of the type determined based on the received configuration data.

15. The UE according to claim 14, wherein the UE is further configured to determine the type of the ACK or NACK message based on the determined decoding margin.

16. The UE according to claim 15, wherein the decoding margin is determined based on the SINR offset and the target BLER, and wherein the UE is further configured to:

determine an impairment comprising an integer number of n decoding iteration used to decode the transport block; and determine a first HARQ-ACK message determined without the impairment and a second HARQ-ACK message determined with the impairment, wherein:

if the impairment is determined to be $n \leq n_{max}$, where $n_{max}$ is the maximum integer number of iterations the UE uses:

the second HARQ-ACK message is determined as ACK if decoding is successful after n iterations; and the second HARQ-ACK message is determined as NACK if decoding is not successful after n iterations;

if both the first HARQ-ACK message and the second HARQ-ACK message are determined as ACK, determine the ACK or NACK message comprising a high margin ACK message; and if the first HARQ-ACK message is determined as ACK while the second HARQ-ACK message is determined as not ACK, determine the ACK or NACK message comprising a low margin ACK message.

17. The UE according to claim 14, wherein a setting from the one or more settings is compared to a respective threshold to determine the decoding margin.

18. The UE according to claim 17, wherein the threshold is determined using reliability metrics comprising one or more of: a signal-to-noise ratio (SNR) offset, the SINR offset, the target BLER, and a target block-error probability, BLEP.

19. The UE according to claim 17, wherein the threshold is determined based on the difference between the target BLER and the outer loop target rate.

20. A radio network node for handling communication in a wireless communications network, the radio network node comprising processing circuitry configured to:

provide, to a user equipment, UE, a configuration data comprising one or more settings used to determine a decoding margin for determining a type of an acknowledgement, ACK, or non-acknowledgement, NACK, message from multi-level ACK or NACK messages, the one or more settings comprising one or more of: a target block error ratio, BLER, an outer loop target rate, a difference between the target BLER and the outer loop target rate, and a signal-to-interference-plus-noise ratio, SINR, offset; and receive, from the UE, the ACK or NACK message of the type for a received transport block, the ACK or NACK message being of the type determined based on the received configuration data.

* * * * *